United States Patent
Hilton et al.

(10) Patent No.: US 8,797,723 B2
(45) Date of Patent: Aug. 5, 2014

(54) PROVIDING ADDITIONAL ELECTRICAL FUNCTIONALITY TO A NODE

(75) Inventors: Paul C. M. Hilton, Millis, MA (US); Kevin M. Johnson, Natick, MA (US)

(73) Assignee: Outsmart Power Systems, LLC, Natick, MA (US)

( * ) Notice: Subject to any disclaimer, the term of this patent is extended or adjusted under 35 U.S.C. 154(b) by 226 days.

(21) Appl. No.: 13/011,428

(22) Filed: Jan. 21, 2011

(65) Prior Publication Data

US 2011/0182012 A1  Jul. 28, 2011

Related U.S. Application Data

(63) Continuation of application No. PCT/US2009/051581, filed on Jul. 23, 2009.

(60) Provisional application No. 61/082,996, filed on Jul. 23, 2008.

(51) Int. Cl.
*H02G 3/14* (2006.01)
(52) U.S. Cl.
USPC ........ 361/679.01; 361/42; 361/183; 361/636; 439/354; 439/441; 315/159; 315/360; 340/568.4; 340/649; 340/656
(58) Field of Classification Search
USPC ............ 361/679.01, 627–632, 636, 641, 643; 200/64, 35 R, 1 R, 329, 33 B, 296, 297, 200/330–333, 339, 293, 315, 42.01; 307/110–115, 64–66, 126, 139, 125; 220/241, 242, 3.8; 174/49–57, 66, 67, 174/58, 549, 520, 48, 135; 439/535, 107, 439/344, 676, 76.1, 188, 441; 455/66.1, 455/67.7, 68
See application file for complete search history.

(56) References Cited

U.S. PATENT DOCUMENTS 2,385,620 A * 9/1945 Fleckenstein ................. 340/687
3,169,239 A * 2/1965 Lacey ........................... 340/638

(Continued)

FOREIGN PATENT DOCUMENTS

| JP | 2003259569 | 9/2003 |
| JP | 2004064136 | 2/2004 |

(Continued)

OTHER PUBLICATIONS

U.S. Office Action dated Jul. 5, 2011 issued in related U.S. Appl. No. 12/447,131.

(Continued)

*Primary Examiner* — Michail V Datskovskiy
(74) *Attorney, Agent, or Firm* — Grossman, Tucker, Perreault & Pfleger, PLLC

(57) ABSTRACT

An aspect of the present disclosure relates to a system, which may include a faceplate and an electrical receptacle or switch. The faceplate may include a panel having a first surface, a second surface, and an opening defined in the panel providing communication between the first and second surfaces. The faceplate may also include an interrupter extending from the first surface of the panel having at least two interrupter contacts thereon and a first electrical circuit operatively coupled to the interrupter contacts. The electrical receptacle or switch may include a housing and a second electrical circuit, wherein the second electrical circuit is in communication with the first electrical circuit when the faceplate is mounted on the electrical receptacle or switch and the interrupter is configured to interrupt the second electrical circuit.

19 Claims, 30 Drawing Sheets

(56) References Cited

U.S. PATENT DOCUMENTS

| | | | |
|---|---|---|---|
| 3,200,221 A * | 8/1965 | Traher | 337/198 |
| 3,225,265 A * | 12/1965 | Krause et al. | 361/183 |
| 3,522,595 A * | 8/1970 | White | 340/593 |
| 3,739,226 A | 6/1973 | Seiter et al. | |
| 3,781,857 A * | 12/1973 | Stendig et al. | 340/521 |
| 3,928,737 A * | 12/1975 | Prasert | 200/51 LM |
| 4,059,843 A | 11/1977 | Girismen | |
| 4,121,152 A | 10/1978 | Hale et al. | |
| 4,259,618 A * | 3/1981 | Nilssen | 315/360 |
| 4,491,785 A | 1/1985 | Pecukonis et al. | |
| 4,522,455 A * | 6/1985 | Johnson | 439/92 |
| 4,616,285 A * | 10/1986 | Sackett | 361/1 |
| 4,617,613 A * | 10/1986 | Rice | 362/95 |
| 4,636,914 A | 1/1987 | Belli | |
| 4,755,913 A | 7/1988 | Sleveland | |
| 4,871,924 A | 10/1989 | Sellati | |
| 5,029,037 A | 7/1991 | Bartelink | |
| 5,153,816 A | 10/1992 | Griffin | |
| 5,365,154 A | 11/1994 | Schneider et al. | |
| 5,424,894 A | 6/1995 | Briscall et al. | |
| 5,485,356 A * | 1/1996 | Nguyen | 362/95 |
| 5,568,399 A | 10/1996 | Sumic | |
| 5,650,771 A * | 7/1997 | Lee | 340/656 |
| 5,660,459 A | 8/1997 | Appeleberg | |
| 5,670,776 A | 9/1997 | Rothbaum | |
| 5,684,469 A | 11/1997 | Toms | |
| 5,833,350 A | 11/1998 | Moreland | |
| 5,838,226 A | 11/1998 | Houggy et al. | |
| 6,021,034 A | 2/2000 | Chan et al. | |
| 6,026,605 A | 2/2000 | Tippett | |
| 6,055,435 A | 4/2000 | Smith et al. | |
| 6,087,588 A * | 7/2000 | Soules | 174/66 |
| 6,097,111 A * | 8/2000 | Anrod | 307/115 |
| 6,107,938 A * | 8/2000 | Du et al. | 340/12.22 |
| 6,120,320 A * | 9/2000 | Veiga et al. | 439/538 |
| 6,396,391 B1 | 5/2002 | Binder | |
| 6,423,900 B1 | 7/2002 | Soules | |
| 6,514,652 B2 * | 2/2003 | Cash, Jr. | 439/106 |
| 6,518,724 B2 | 2/2003 | Janik | |
| 6,805,469 B1 | 10/2004 | Barton | |
| 6,814,611 B1 * | 11/2004 | Torres | 439/535 |
| 6,853,939 B2 | 2/2005 | Coffeen | |
| 6,864,798 B2 | 3/2005 | Janik | |
| 6,867,558 B2 | 3/2005 | Gaus, Jr. et al. | |
| 6,872,887 B2 * | 3/2005 | Shotey et al. | 174/66 |
| 6,891,284 B2 * | 5/2005 | Tilley | 307/116 |
| 6,993,289 B2 | 1/2006 | Janik | |
| 6,993,417 B2 * | 1/2006 | Osann, Jr. | 700/291 |
| 7,026,550 B2 * | 4/2006 | McBain | 174/67 |
| 7,057,401 B2 | 6/2006 | Blades | |
| 7,082,541 B2 | 7/2006 | Hammond et al. | |
| 7,209,839 B2 | 4/2007 | Roytelman | |
| 7,253,732 B2 | 8/2007 | Osann | |
| 7,276,915 B1 | 10/2007 | Euler et al. | |
| 7,318,653 B2 * | 1/2008 | Chien | 362/95 |
| 7,385,473 B2 * | 6/2008 | Fabian et al. | 337/36 |
| 7,403,598 B2 | 7/2008 | Tyroler et al. | |
| 7,483,524 B2 | 1/2009 | Binder | |
| 7,527,519 B2 * | 5/2009 | Van Dyne | 439/441 |
| 7,549,785 B2 | 6/2009 | Faunce | |
| 7,612,653 B2 * | 11/2009 | Miller et al. | 340/286.02 |
| 7,688,841 B2 | 3/2010 | Binder | |
| 7,690,949 B2 | 4/2010 | Binder | |
| 7,734,038 B2 * | 6/2010 | Martich et al. | 379/413.04 |
| 7,821,160 B1 | 10/2010 | Roosli et al. | |
| 7,867,035 B2 | 1/2011 | Binder | |
| 7,930,118 B2 | 4/2011 | Vinden et al. | |
| 2002/0086567 A1 | 7/2002 | Cash | |
| 2002/0118498 A1 * | 8/2002 | Nordling | 361/42 |
| 2004/0015340 A1 | 1/2004 | Kadoi et al. | |
| 2004/0131104 A1 | 7/2004 | Seferian | |
| 2004/0142601 A1 | 7/2004 | Luu | |
| 2004/0243377 A1 | 12/2004 | Roytelman | |
| 2005/0184867 A1 | 8/2005 | Osann | |
| 2005/0201190 A1 | 9/2005 | Kowalski | |
| 2005/0275979 A1 | 12/2005 | Xu | |
| 2006/0038672 A1 | 2/2006 | Schoettle | |
| 2006/0072271 A1 | 4/2006 | Jones et al. | |
| 2006/0072302 A1 | 4/2006 | Chien | |
| 2006/0073731 A1 * | 4/2006 | Chien | 439/536 |
| 2006/0077614 A1 | 4/2006 | Bruccoleri et al. | |
| 2006/0262462 A1 * | 11/2006 | Barton | 361/1 |
| 2006/0267788 A1 | 11/2006 | Delany | |
| 2007/0024264 A1 | 2/2007 | Lestician | |
| 2007/0120978 A1 | 5/2007 | Jones et al. | |
| 2007/0227867 A1 | 10/2007 | Yang | |
| 2007/0228183 A1 | 10/2007 | Kennedy et al. | |
| 2008/0012681 A1 | 1/2008 | Kadar et al. | |
| 2008/0015740 A1 * | 1/2008 | Osann, Jr. | 700/276 |
| 2008/0024605 A1 | 1/2008 | Osann, Jr. | |
| 2008/0030971 A1 * | 2/2008 | Miller et al. | 361/794 |
| 2008/0266080 A1 * | 10/2008 | Leung et al. | 340/539.16 |
| 2009/0009353 A1 | 1/2009 | Schoettle | |
| 2009/0058193 A1 | 3/2009 | Reid et al. | |
| 2009/0073641 A1 | 3/2009 | Ross | |
| 2009/0322159 A1 | 12/2009 | Dubose et al. | |
| 2010/0084482 A1 | 4/2010 | Kennedy et al. | |
| 2011/0260709 A1 | 10/2011 | Johnson et al. | |

FOREIGN PATENT DOCUMENTS

| | | |
|---|---|---|
| WO | 2005039016 | 4/2005 |
| WO | 2008005225 | 5/2008 |
| WO | 2008052223 | 5/2008 |

OTHER PUBLICATIONS

U.S. Office Action dated Jan. 23, 2012 issued in related U.S. Appl. No. 12/447,138.

U.S. Office Action dated Jan. 12, 2012 issued in related U.S. Appl. No. 12/447,131.

International Search Report and Written Opinion dated May 5, 2008 issued in related International Patent Application No. PCT/US07/82909.

International Search Report and Written Opinion dated Apr. 30, 2008 issued in related International Patent Application No. PCT/US07/82912.

International Search Report and Written Opinion dated Jul. 6, 2009 issued in related International Patent Application No. PCT/US2009/043390.

International Preliminary Report on Patentability dated Sep. 15, 2009 issued in related International Patent Application No. PCT/US2009/051581.

International Search Report and Written Opinion dated Sep. 15, 2009 issued in related International Patent Application No. PCT/US2009/051581.

International Search Report and Written Opinion dated Feb. 23, 2010 issued in related International Patent Application No. PCT/US2009/056268.

Whitlock, "Understanding, Finding, and Eliminating Ground Loops," Class Manual Course Codes A14T and B50T, CEDIA Expo 2003.

U.S. Office Action dated Dec. 13, 2010 issued in related U.S. Appl. No. 12/447,131.

Extended European Search Report dated Dec. 2, 2011 issued in related Patent Application No. 07863633.9-1232.

Extended European Search Report dated Nov. 24, 2011 issued in related Patent Application No. 07863631.3-1232.

U.S. Office Action dated Jul. 23, 2012 issued in U.S. Appl. No. 12/447,131.

Japanese Office Action dated Sep. 4, 2012 issued in Japanese Patent Application No. 2009-534929.

Japanese Office Action dated Oct. 9, 2012 issued in Japanese Patent Application No. 2009-534928.

U.S. Office Action dated May 2, 2012 issued in U.S. Appl. No. 13/041,231.

U.S. Office Action dated Oct. 5, 2012 issued in U.S. Appl. No. 12/941,775.

U.S. Office Action dated Nov. 7, 2012 issued in U.S. Appl. No. 12/447,138.

U.S. Office Action dated Aug. 9, 2013 issued in U.S. Appl. No. 12/447,131.

* cited by examiner

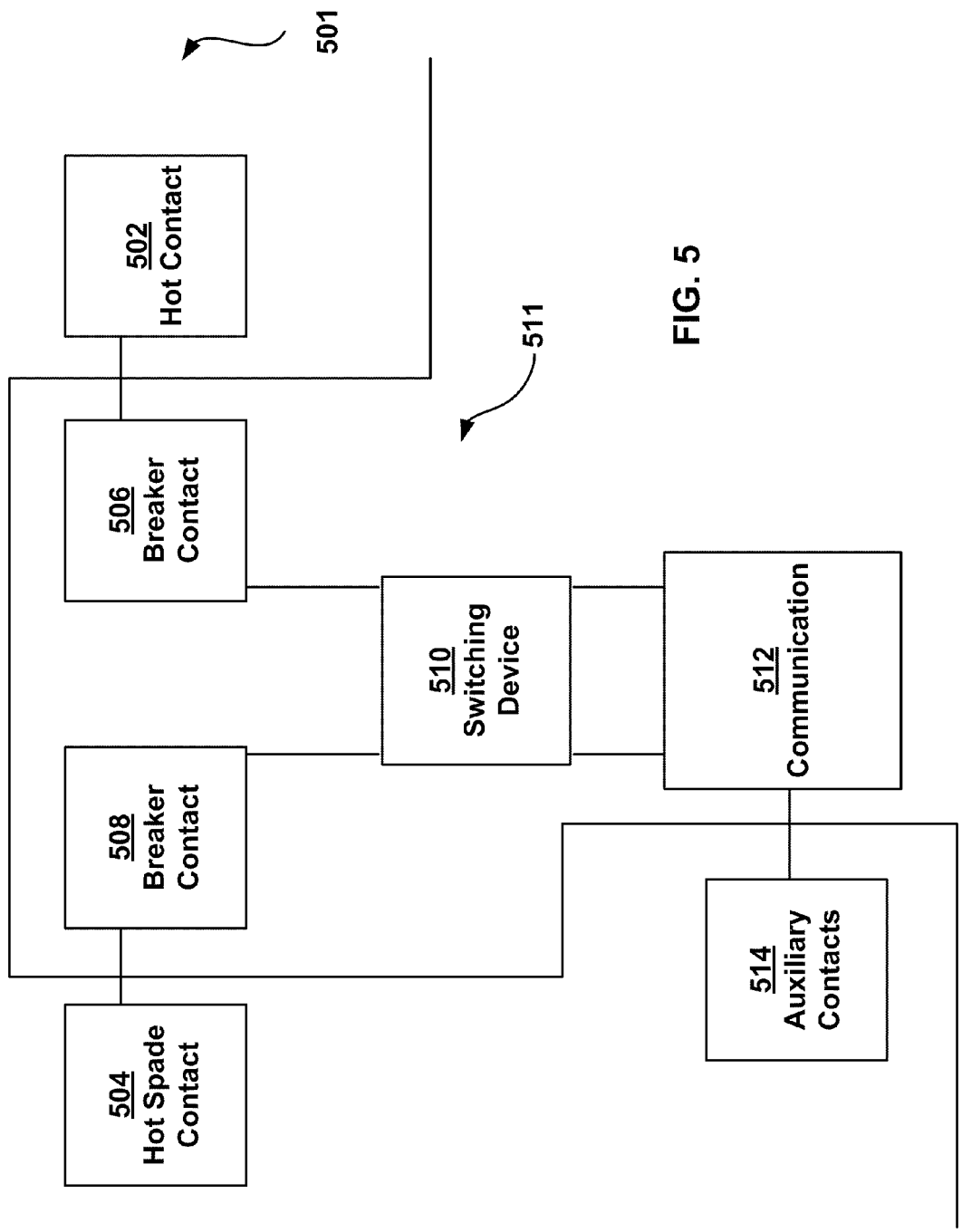

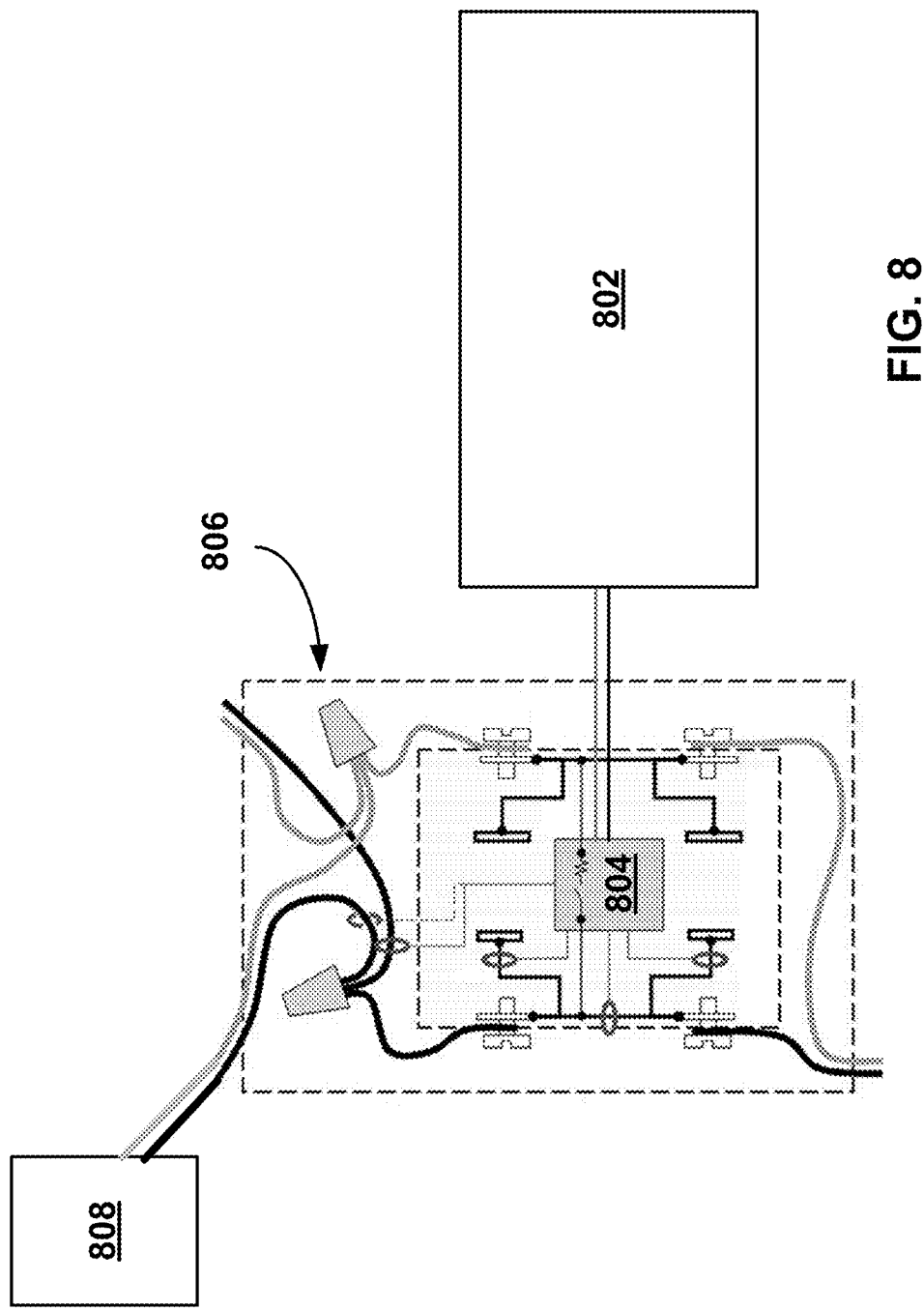

PROVIDING ADDITIONAL ELECTRICAL FUNCTIONALITY TO A NODE

CROSS-REFERENCE TO RELATED APPLICATIONS

This application is a continuation of International Application Number PCT/US2009/051581 filed Jul. 23, 2009, which claims benefit of U.S. Provisional Application No. 61/082,996 filed on Jul. 23, 2008, the teachings of which are incorporated herein by reference.

FIELD OF INVENTION

The present disclosure relates to a device and system for providing additional switching functionality to a node, such as a receptacle, switch or other device in an electrical installation.

BACKGROUND

It may be desirable to power appliances (possibly in the form of a faceplate) that are not plugged into an outlet or located where a switch or other device is installed. It may also be desirable to insert additional or varied functionality within a node (wherein a node may include a receptacle, switch or any other device in an electrical installation) circuit. To facilitate either of these scenarios it may be advantageous to have additional contacts, in addition to the standard screw lugs for wiring, on a node that may allow devices to either draw power or insert themselves into the node circuit in order to alter the circuit or provide additional functionality. This may then allow modification of the electrical installation without re-wiring.

There are a number of products on the market that may allow users to switch an outlet or switch on (or off) remotely. These products may burden the switch or outlet with the means to perform this switching operation. In an installation where an entire electrical system may be installed or replaced, it may not be known which outlets or switches might need or desirably include remote switching functionality. One might then make every installed outlet and switch capable of remote switching functionality. Providing such functionality as an integral part of the outlets and/or switches may add undue cost and complexity, especially if many of these outlets and/or switches do not actually need remote switching functionality.

SUMMARY

An aspect of the present disclosure relates to a system, which may include a faceplate and an electrical receptacle or switch. The faceplate may include a panel having a first surface, a second surface, and an opening defined in the panel providing communication between the first and second surfaces. The faceplate may also include an interrupter extending from the first surface of the panel having at least two interrupter contacts thereon and a first electrical circuit operatively coupled to the interrupter contacts. The electrical receptacle or switch may include a housing and a second electrical circuit, wherein the second electrical circuit is in communication with the first electrical circuit when the faceplate is mounted on the electrical receptacle or switch and the interrupter is configured to interrupt the second electrical circuit.

A further aspect of the present disclosure relates to a faceplate. The faceplate may include a panel having a first surface, a second surface and an opening. The faceplate may also include an interrupter extending from a first surface of said panel having at least two interrupter contacts thereon. In addition, an electrical circuit may be mounted on the face plate, wherein the circuit is coupled to the interrupter contacts.

Another aspect of the present disclosure relates to an electrical receptacle or switch. The electrical receptacle or switch may include a housing and an opening defined by the housing. The receptacle or switch may also include an electrical circuit including a hot contact and hot spade contact in separable electrical communication with said hot contact. The opening may be configured to receive an interrupter and position the interrupter between the hot contact and the hot spade contact.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein:

FIG. 5 illustrates an example of a first circuit in a receptacle and a second circuit provided in a faceplate;

FIG. 8 illustrates an example of node electronics in communication with a faceplate through auxiliary contacts;

DESCRIPTION

The present disclosure relates to an electrical device or system that may provide functionality to electrical networks. One area of functionality may be included in a faceplate or front cover trim plate that may be applied to receptacles, switches and/or other node devices. The system may allow for electrical communication between the faceplate and a node device such as an outlet, switch, etc. via contacts on the node device allowing for remote control of the faceplate through wired or wireless means of communication. These contacts on the node may also allow signals to be sent to the faceplate which may be used to control functions/functionality in the faceplate. In one example, the node (i.e., outlet, switch, etc.) may include a processor, sensor and/or a lower voltage power supply, which may be configured to supply and detect and electrical signal. In addition, the node may be provided in systems configured to locate and map the nodes relative to each other. Such node and/or systems may include those described in International Applications PCT/US07/82909 and PCT/US07/82912 both filed on Oct. 29, 2007, the disclosures of which are incorporated herein by reference.

Figure 1:
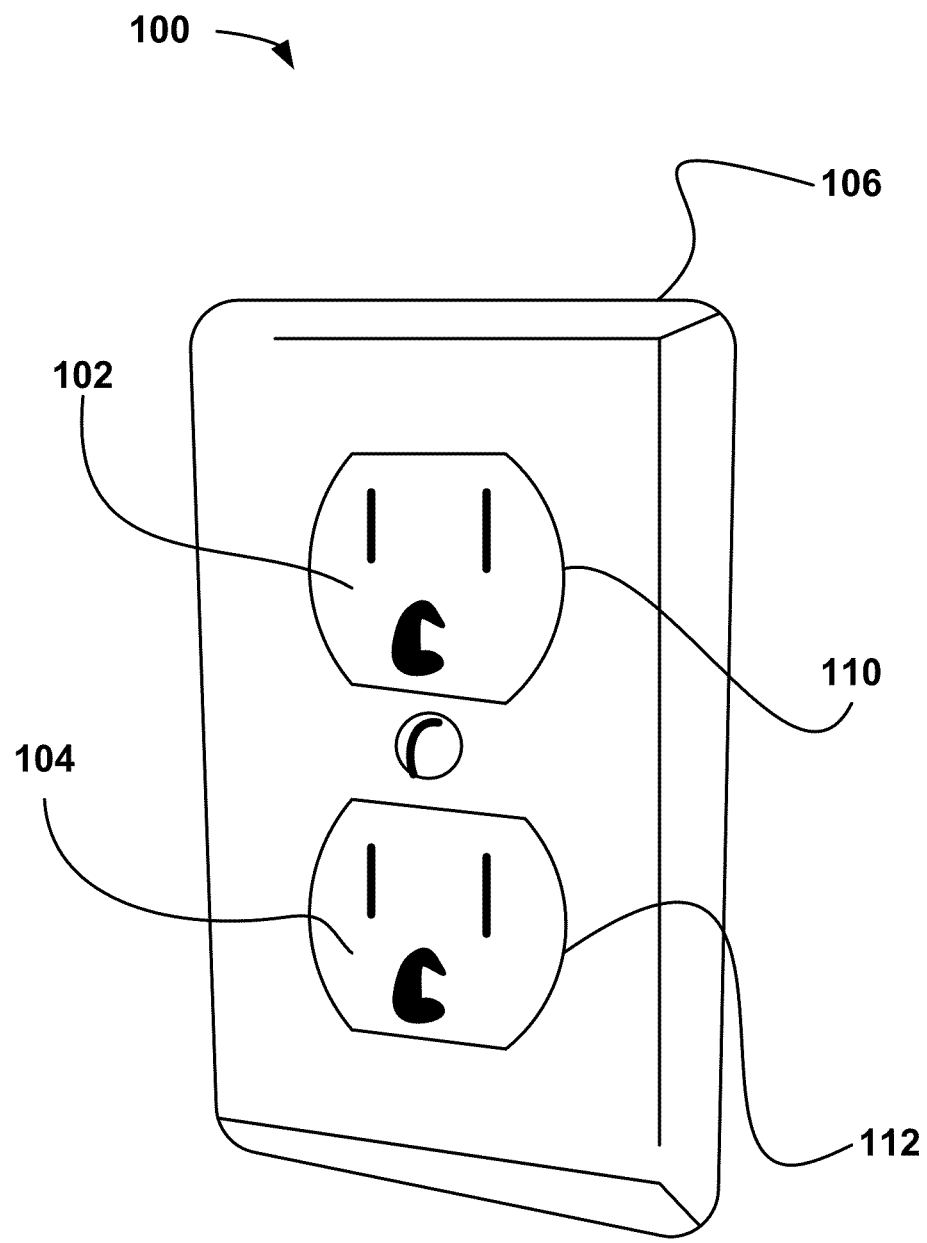
FIG. 1 illustrates an example of a node in the form of a receptacle including a faceplate.

FIG. 1 illustrates an example of a node in the form of a duplex outlet. As seen, the outlet 100 may include two sockets 102 and 104 and a faceplate 106 mounted over the sockets defining openings 110, 112 for access to the sockets, or in the case of a light switch, access to the switch toggle. In some examples, a faceplate may insert itself within the wiring circuit between the wiring lug or other wiring fixation device and, in the case of an outlet, the hot contacts, which may change or re-route the electrical path of the circuit used to power the node. The new electrical path may travel, for example, into a circuit in the faceplate, where remote switching capability may be added via a relay or other switching device, and back into the outlet or switch to which the faceplate is attached. This may then allow remote switching functionality to be added to any outlet or switch that may already be installed by simply using an appropriately configured faceplate. For example, such remote switching faceplate may include an electromagnetic communication device that may operate via wireless communication, including optical, such as IR, or radio frequency. In addition, remote switching capability of the faceplate may include electrical communication with a remote device in electrical communication with the node.

Figure 2:
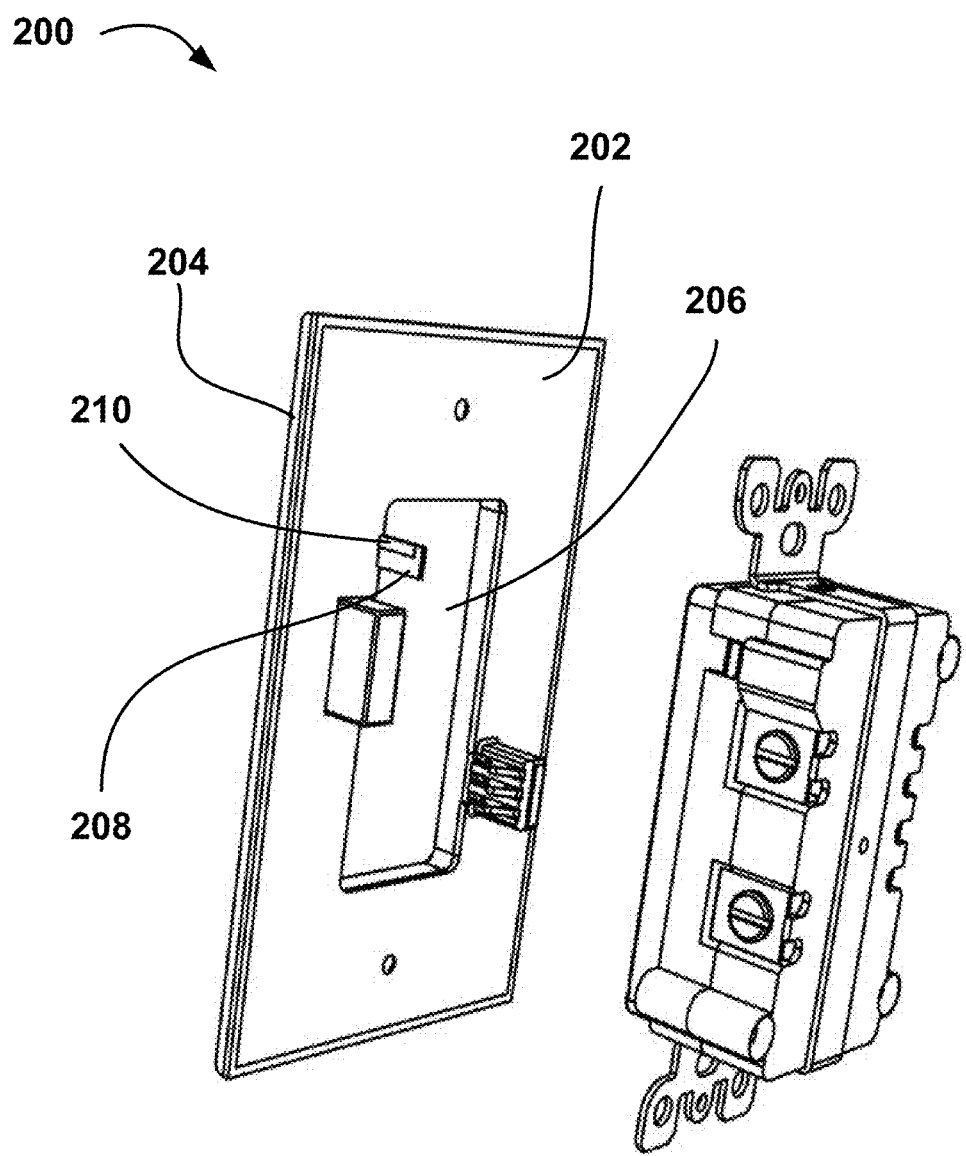
FIG. 2 illustrates an example of a faceplate including an interrupter.

An example of a device or system may include a faceplate and an electrical receptacle, illustrated in FIG. 2. The faceplate 200 may include a first surface 202, a second surface 204 and an opening 206 providing communication between the first and second surface. The faceplate may also include an interrupter 208, extending from one of the surfaces which may, in some examples, be made of an electrically insulating material. The interrupter may include at least two electrical interrupter contacts 210. As illustrated, an electrical contact is positioned on either side of the interrupter; however, it may be appreciated that the contacts may all be positioned on one side of the interrupter or in other arrangements. Accordingly, an interrupter may be understood as any structure configured to interrupt a circuit. Interrupting a circuit may be understood as opening a circuit or providing a discontinuity in the circuit. While, in the present illustration, the interrupter is illustrated in the form of a plate, the interrupter may be in the form of a pin or other geometry, provided the interrupter may interrupt the flow of current in the circuit providing power to the receptacle or switch.

Figure 3A:
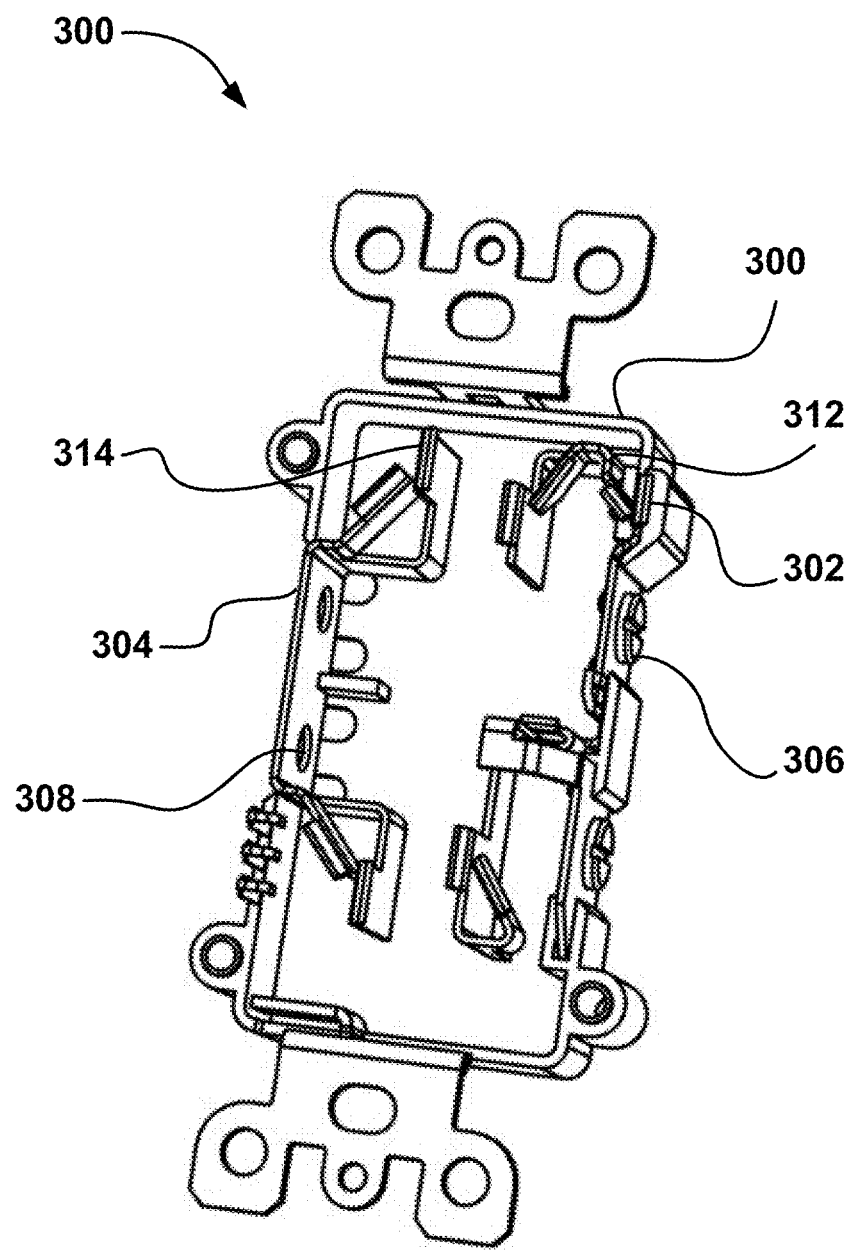
FIG. 3a illustrates an example of a receptacle.

As noted above, the system may also include a receptacle or switch. FIG. 3a illustrates an example of a receptacle 300 without the cover including the spade sockets mounted on the housing 301 of the receptacle. The receptacle 300 may include a first hot contact 302, a neutral contact 304 and optionally, other contacts. A hot contact may be understood as a contact electrically connected either directly or indirectly to the hot side of an electrical circuit. A neutral contact may be understood as a contact electrically connected either directly or indirectly to the neutral side of an electrical circuit. Electrically connected or in electrical communication may be understood as providing a pathway for current to flow, which may include, in some examples the use of induction.

The receptacle may include a hot wire retention device 306 and a neutral wire retention device 308 providing a connection between the hot and neutral contacts in the receptacle and the hot and neutral sides of an electrical circuit. A wire retention device may be understood as a lug or other clip or crimp that may mechanically hold a hot, neutral or other supply line in place, such as against the hot contact 302, neutral contact 304 or other contact.

The receptacle may also include a second hot contact 312 and a neutral contact 314. In a receptacle, these contacts may be spade contacts. Spade contacts may be understood as contacts, or the portions of a contact that may provide a connection to the prong (or spade) of a plug. The hot spade contact 312 may be a discrete contact (i.e., discrete or insulated from the hot contact itself) that may be physically biased towards the hot contact 302 and may touch the hot contact 302. The neutral spade contact 314 may be discrete from the neutral contact or integrated with the neutral contact 304 as illustrated.

Figure 3B:
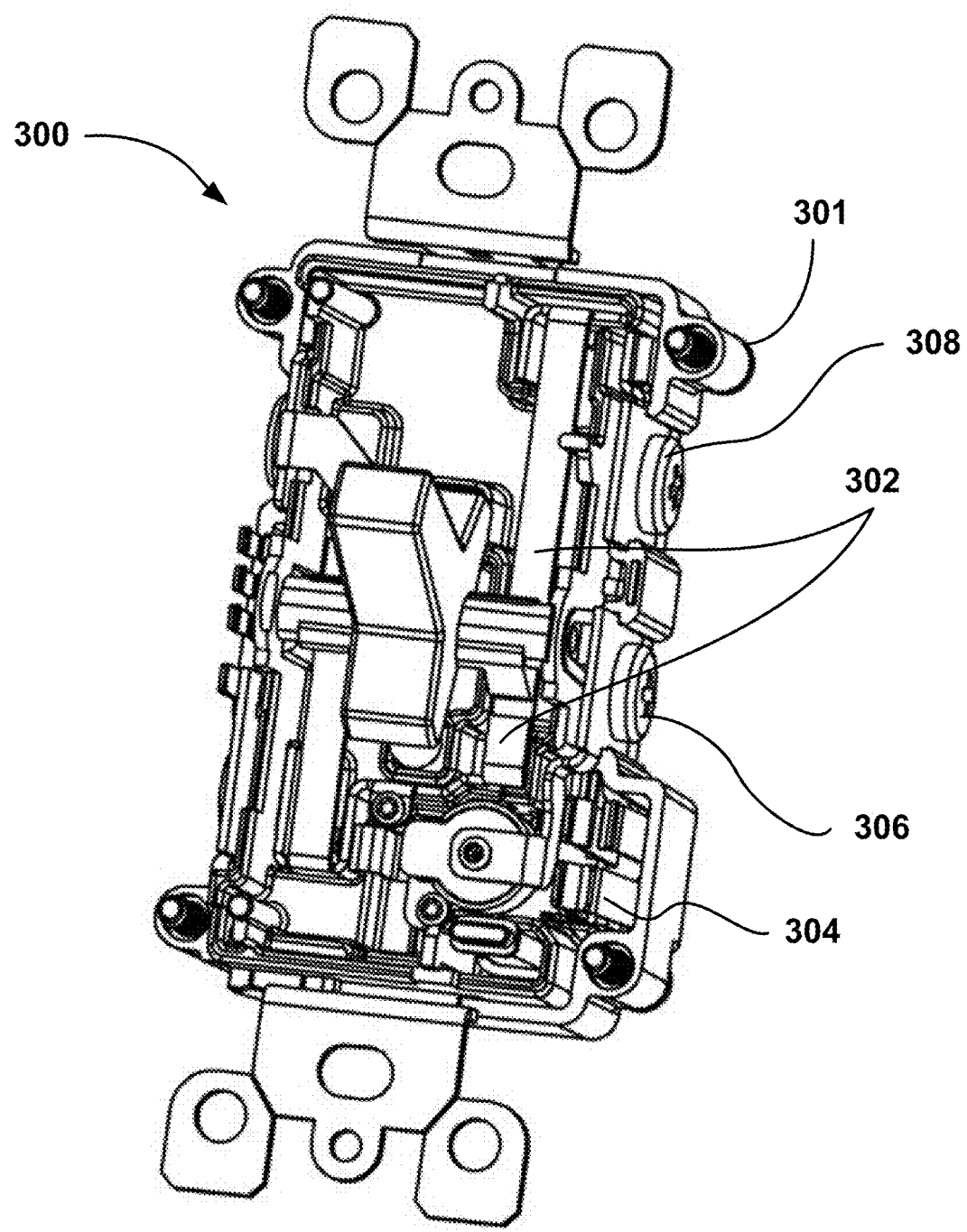
FIG. 3b illustrates an example of a switch.

FIG. 3b illustrates an example of a three-way switch 300 without a cover on the housing 301. The switch may include a first set of hot contacts 302 and a second set of hot contacts 304. Each set of hot contacts may include at least two hot contacts that may be electrically separable. The switch may also include a first hot wire retention device 306, a second hot wire retention device 308, and may include additional wire retention devices.

Figure 4:
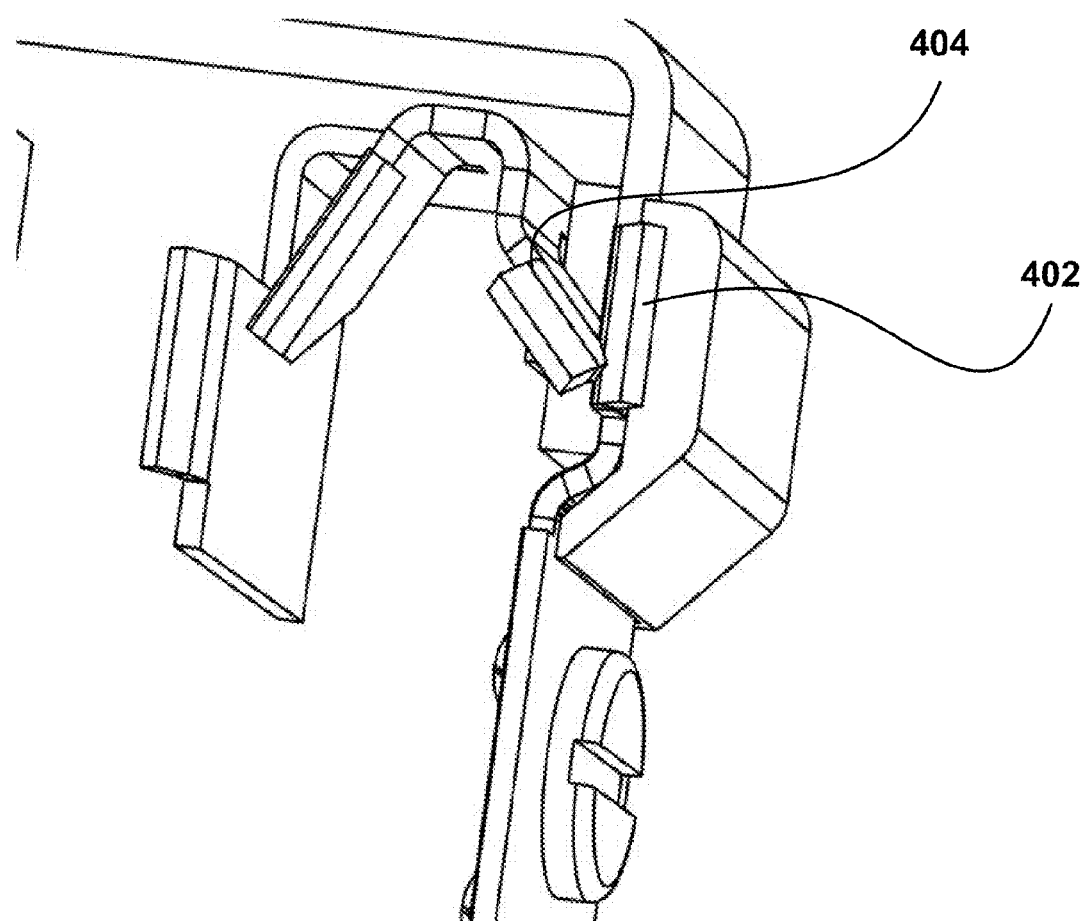
FIG. 4 illustrates an example of a receptacle hot contact and hot spade contact.

When the faceplate is attached to a node (e.g., an outlet or switch) the interrupter may break or interrupt the electrical circuit between the wire lug and, in the case of an outlet, the spade contacts. In some examples, as illustrated in FIG. 4, the interrupter may be positioned between the hot contact 402 and the second hot spade contact 404 or between a set of hot contacts (as in a switch), which may physically separate the two contacts. When the interrupter is inserted, the contacts on either side of the interrupter may make contact with either side of the circuit (i.e., hot contact and/or hot spade contact) which the insulating interrupter may interrupt. In such a manner, the circuit may be rerouted though an electronic circuit mounted in the faceplate and back into the outlet.

An example of an electrical circuit mounted on or in a faceplate is illustrated in the block diagram of FIG. 5. As noted above, a receptacle may include in a first circuit 501 a hot contact 502 and a second hot contact, such as a hot spade contact 504. When the interrupter is positioned between the hot contact 502 and the second hot contact 504, the hot contact 502 may physically contact a first interrupter contact 506 and the second hot contact 504 may physically contact the second interrupter contact 508. The interrupter contacts may be in electrical communication with a switching device 510, such as a relay, which may open and/or close the second circuit 501 via the circuit 511 in the faceplate. The faceplate circuit 511 may contain communication components 512 and/or a processor or other circuitry components that may be in either direct or indirect electrical communication with the switching device and/or the base node electronics. Furthermore, as described further below, additional auxiliary contacts 514 may be provided in the faceplate, which may electrically communicate with the node (i.e., outlet, switch, etc.) and any node electronics provided therein. The communication device 512 may include, for example, an electromagnetic receiver or transceiver and may be an optical device (configured to respond to infra-red, ultra-violet or visible light), a radio frequency device (configured to response to frequencies and/or protocols in wi-fi, Bluetooth, or other ranges), or a wireline transceiver. The communication device may receive electronic communication.

This rerouting of the circuit may allow circuitry/switching components to be inserted into the circuit at some indeterminate time after installation. In addition, it may be appreciated that, in some examples, the circuit positioned or mounted in the faceplate may be in series with the circuit of the receptacle or switch. In an example of a switch, the interrupter may be inserted between one of the hot set of contacts.

Figure 6A:
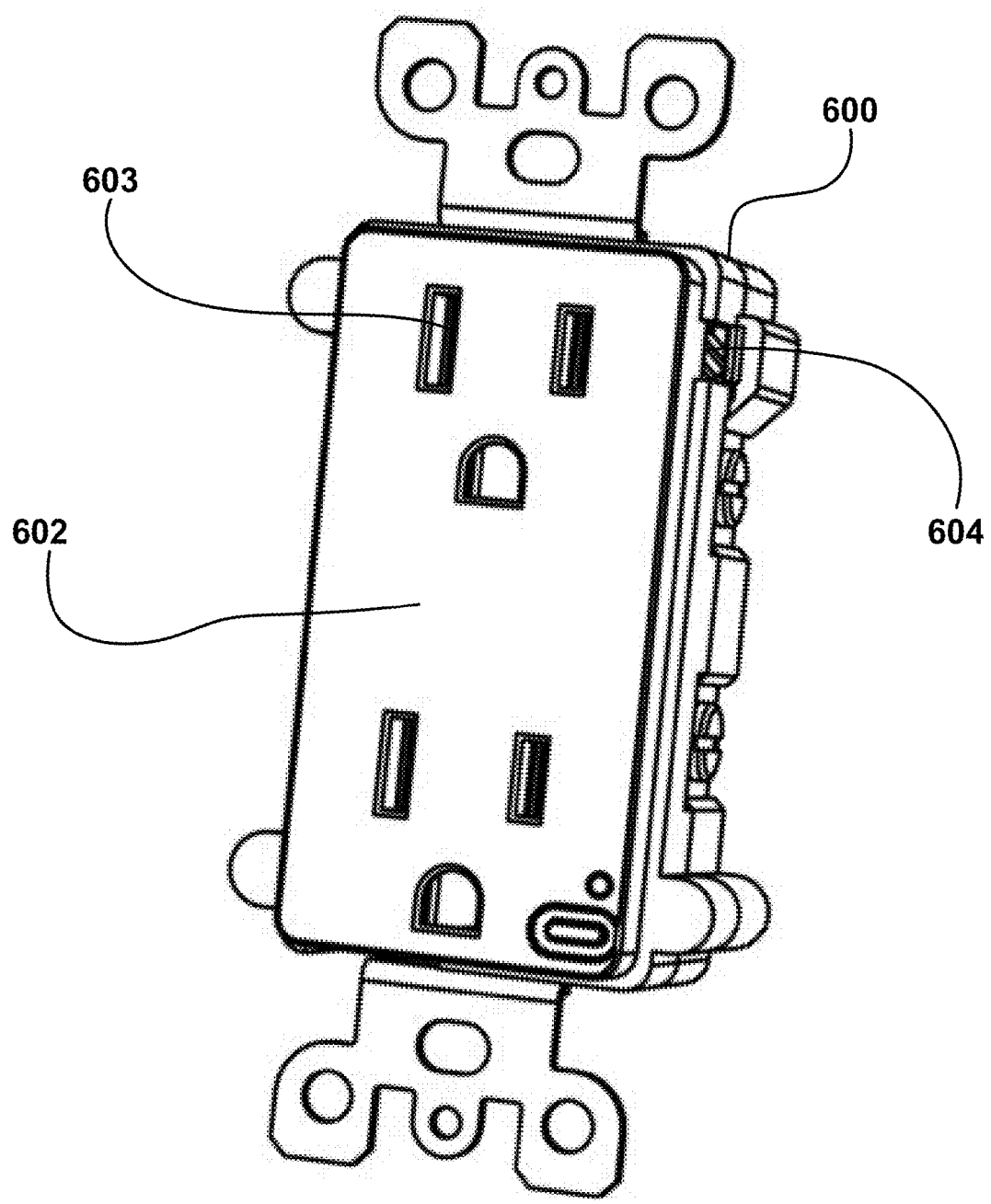
FIG. 6a illustrates an example of a receptacle housing.
Figure 6B:
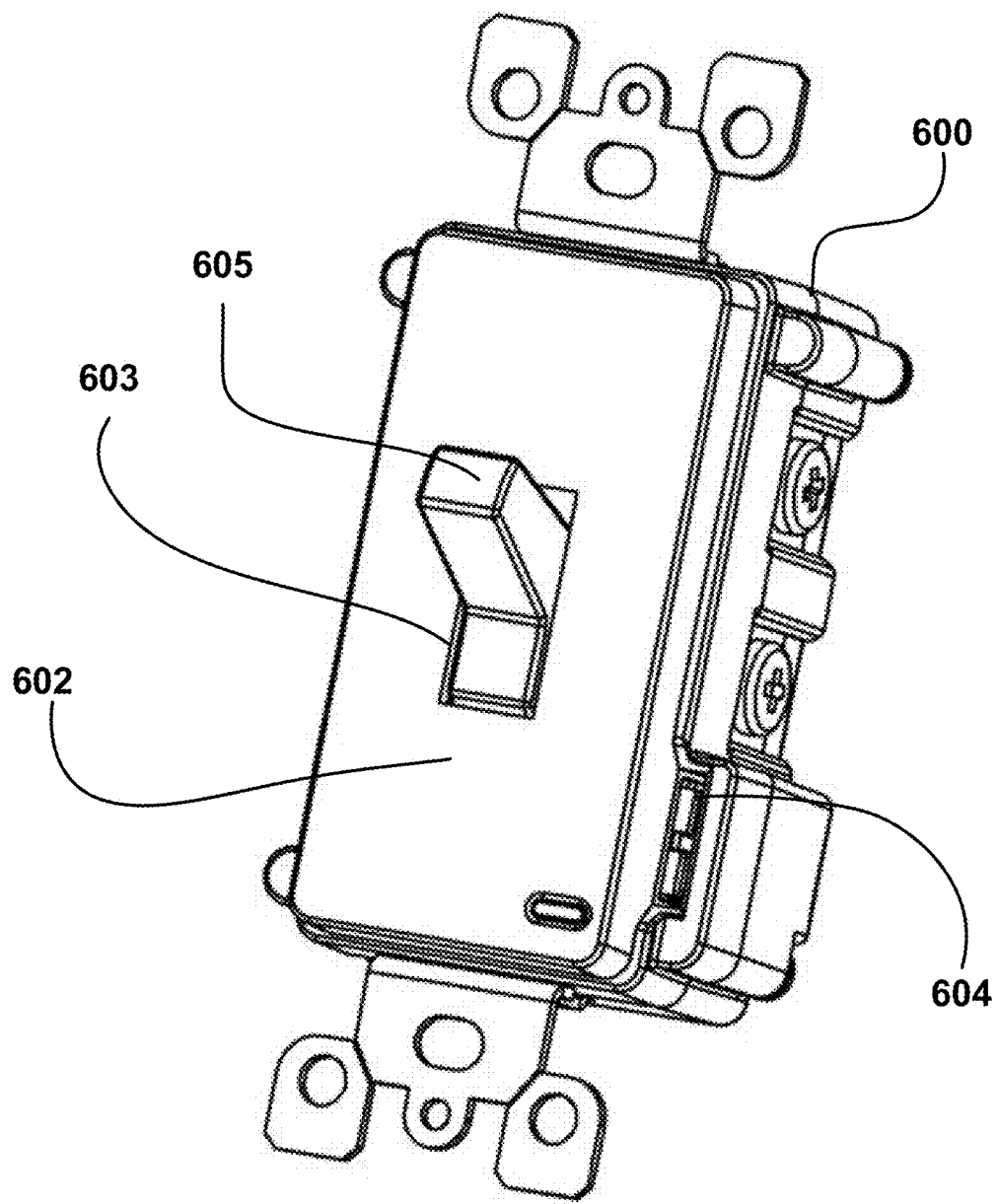
FIG. 6b illustrates an example of a switch housing.

To provide access for the interrupter into the receptacle or switch, the receptacle or switch may include a housing. FIG. 6a illustrates an example of a receptacle. The housing 600 of the receptacle may include a cover 602 having sockets 603 for receiving plug prongs affixed to the housing. In addition, the housing may have a slot or opening 604 defined in the housing, which may be configured to receive the interrupter when the faceplate is mounted on the electrical receptacle or switch, such that the interrupter may pass through the opening into the housing. Furthermore, the opening may be positioned so as to allow the interrupter to itself be positioned between the contacts (hot contact and hot spade contact) interrupting the circuit in the outlet. Similarly, in the arrangement of a switch, an example of which is illustrated in FIG. 6b, the housing may include a cover 602 including an opening 603 defined therein for a toggle 605, affixed to the housing and a slot or opening 604. The opening may be configured to receive the interrupter when the faceplate is mounted on the electrical receptacle or switch, such that the interrupter may pass through the opening into the housing and extending between a set of hot contacts provided in the switch.

It may be appreciated that other devices may also be inserted into the circuit in a similar manner. In addition, it may be appreciated that in some examples, it may be possible to have two interrupters extending from the faceplate, one that may engage the hot leg and one that may engage the neutral leg of the receptacle or switch.

Figure 7A:
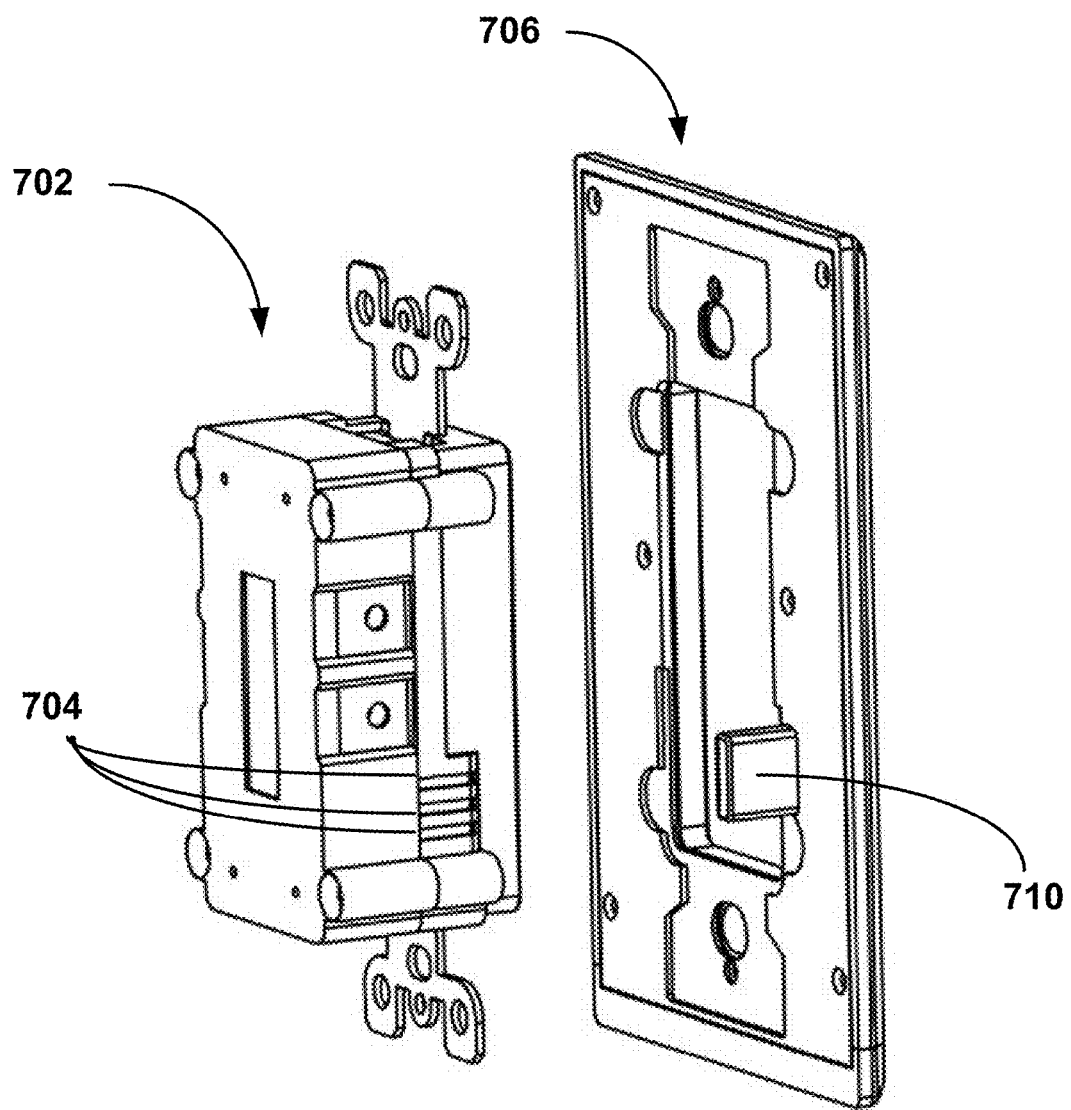
FIG. 7a and FIG. 7b illustrate an example of auxiliary contacts provided on a faceplate and on a switch.
Figure 7B:
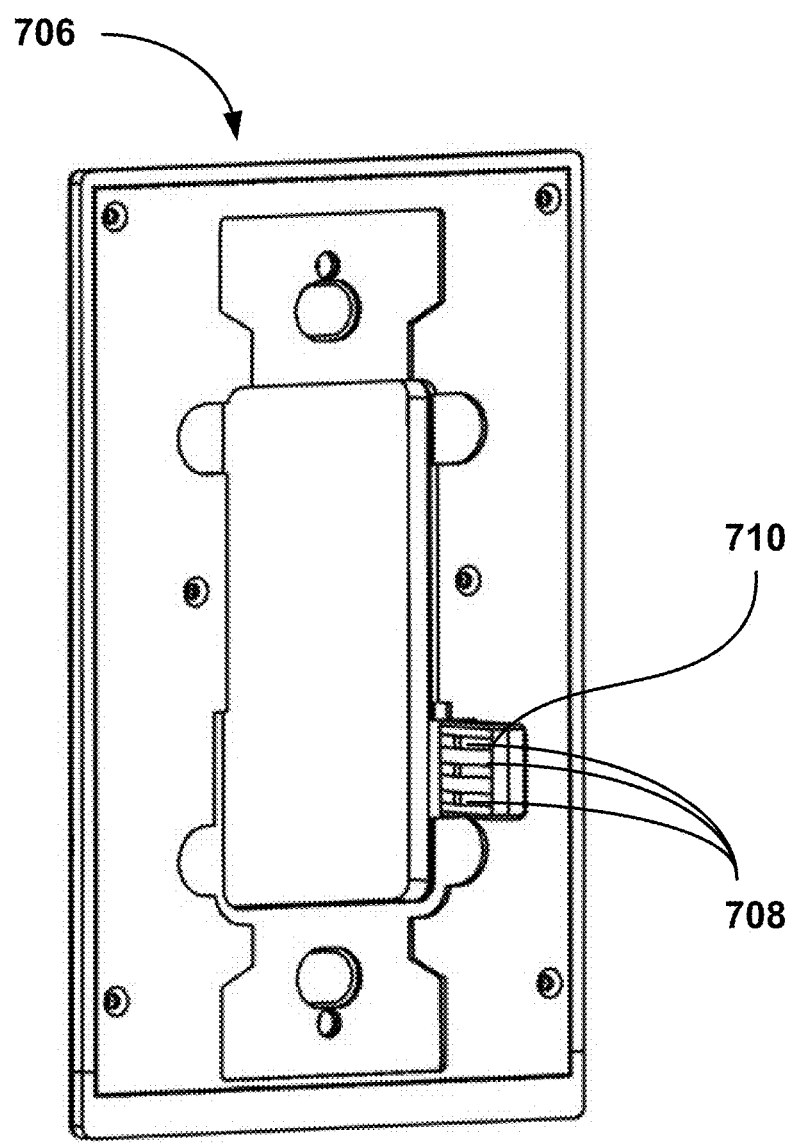

In addition, as alluded to above, the receptacle or switch may be remotely operated by electrical communication over the circuit provided in a receptacle or switch. The faceplate may receive communication signals and/or power from a receptacle by an interface between the faceplate and the receptacle. FIG. 7a illustrates an example of a receptacle 702 which may be provided with power from a power distribution center through a circuit breaker in a circuit breaker panel. The outlet 702 may includes a number of auxiliary contacts 704, three as illustrated. The faceplate 706 may also include a number of auxiliary contacts 708 (illustrated in FIG. 7b) on a finger or tab 710, which may engage the auxiliary contacts 704 on the outlet 702. The auxiliary contacts may provide power and/or communication to the faceplate 706.

It may be appreciated that where communication is contemplated without the need for a power supply, one auxiliary contact may be provided on the tab and the receptacle. However, where power and/or communication may be contemplated, two or more auxiliary contacts may be provided on the faceplate and/or receptacle or switch. Accordingly, the receptacle or switch may be controlled or monitored in a number of locations, such as at an interface on the receptacle or switch itself (such as the switch toggle), or as described above, by remote wireless or powerline communications.

Power may be provided to a faceplate through the auxiliary contacts in the outlet, switch or other receptacle through node electronics discussed further below. Each node may be capable of providing a certain amount of low voltage power, including ≤30 volts and all values or increments between 0 and 30 volts, and a certain amount of communication bandwidth. Bandwidth may be understood as the amount of data that may be passed through a communications channel in a given period of time. If the faceplate can operate within the limits of the node power level and communication bandwidth, it may use the node for both power and communication. FIG. 8 illustrates an exemplary schematic of power distribution to a faceplate 802. As noted above, the power may be provided through the node electronics 804 in an outlet 806. The outlet 806 may receive power from an electrical distribution system 808, such as a circuit panel.

Another aspect of the present disclosure relates to using nodes (e.g. outlets and switches, junction boxes ... etc.) and their associated electronics to serve as a means for mounting, powering and/or communicating with "appliances." An appliance may be defined as a device with electronics that has one or more useful functions. These appliances may be embedded or incorporated into a outlet faceplate or switch faceplate, as well as, in some examples, a junction box cover ... etc., and the appliance may include a means for drawing power from the nodes and communicating with or through the nodes (i.e., outlets or receptacles). It is important to note that these appliances do not interfere with the normal function of a node—the receptacles of an outlet remain open for plugs, switches continue to function and junction boxes continue to transmit power ... etc. These appliances may not follow the form factor of existing faceplates (having a rather flat and rectangular shape), and may be modified in one or more dimensions to accommodate specific types of functionality. In addition to remote switching embedded in the faceplate, these appliances may include such functionality as emergency lighting, night lights, environmental monitors, air quality monitors, alarms, sensors, intercoms, sound monitors, security devices, including cameras, battery backup, displays and information portals, among many others.

Figure 9:
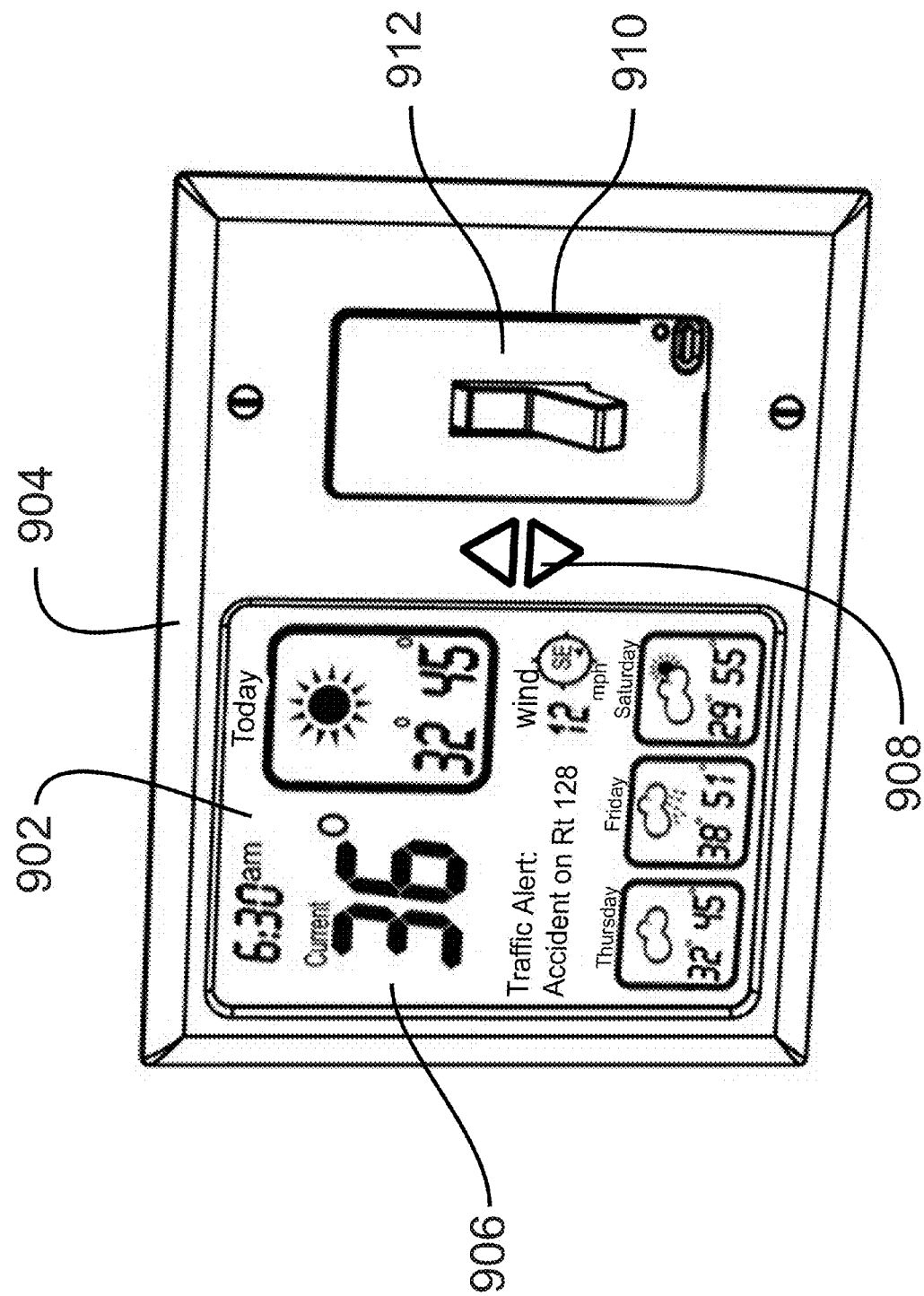
FIG. 9 illustrates an example of an appliance that may be integrated into a faceplate.

FIG. 9 illustrates an example of an appliance 902 integrated into a faceplate 904. In this example, the appliance is a thermostat controller. The appliance provides an interface 906, which in this case informs a user of the day, time of day, temperature, whether the heat is on, etc. In addition, functional controls 908 are provided for use of the appliance, including toggle keys and selection buttons. The faceplate may also define an opening 910 for receiving a switch 912 or other receptacle.

Once again, an appliance may receive power from a node by an interface between the faceplate and the node, as described above. In examples where a faceplate or appliance needs either more power or greater communication bandwidth, the nodes may be configured to enable an appliance to draw power from and communicate over the power network without the limitations imposed by the node. In other words, while the faceplate may still provide an interface between the appliance and the node, e.g. the outlet, the power is not provided through the power supply of the node electronics. These auxiliary contacts may also provide the voltage and power generally available on the node network (e.g. 110 volts) and/or an independent communication pathway. This may particularly be true in the case where the circuit in the faceplate is open preventing power from flowing through the receptacle or switch circuit. The node electronics may still transmit power to these contacts and/or have the ability to interact with the power provided from such contacts, for instance limiting current, switching power on or off, monitoring power, etc.

Figure 10:
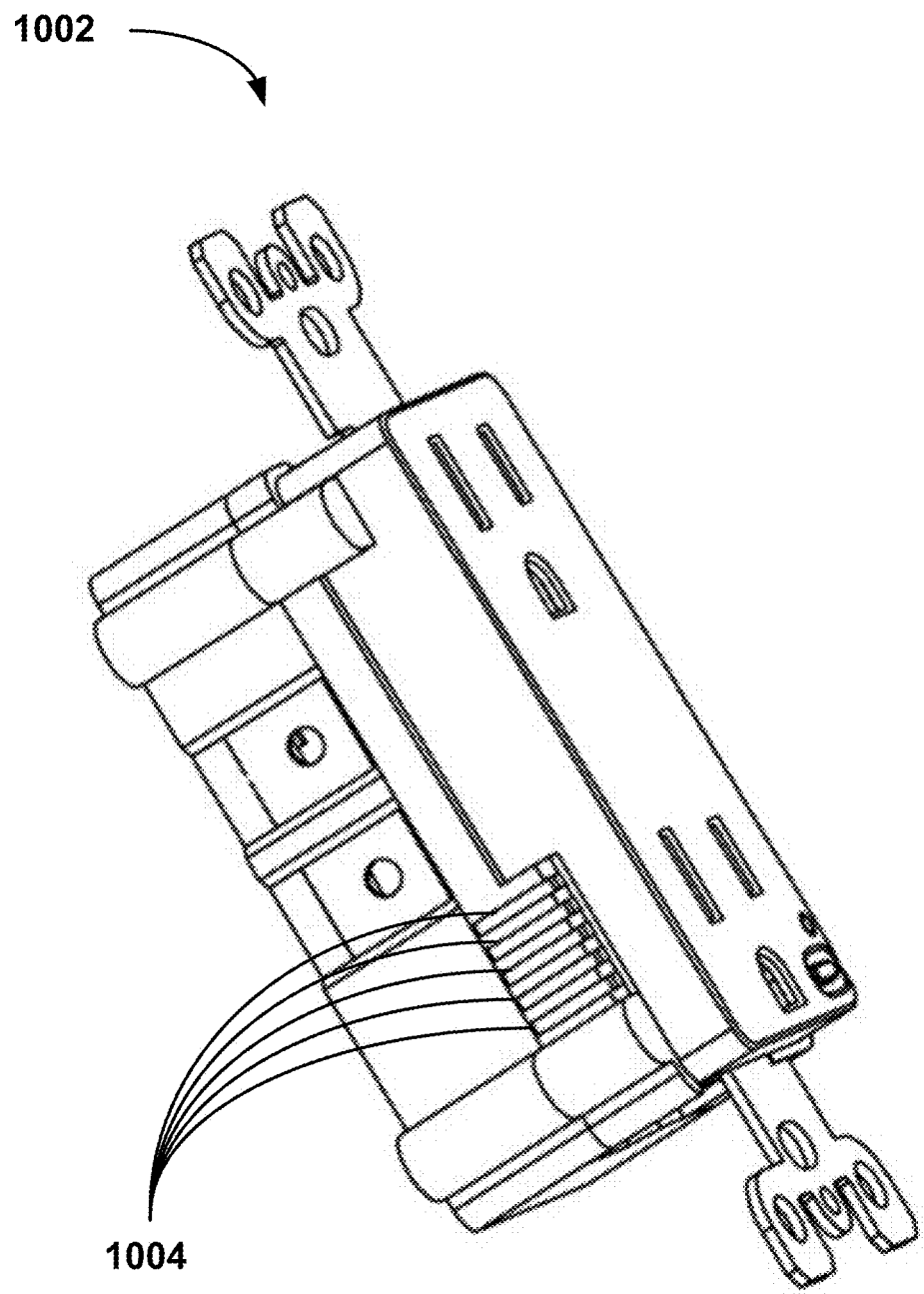
FIG. 10 illustrates an example of a receptacle with a plurality of auxiliary contacts.
Figure 11:
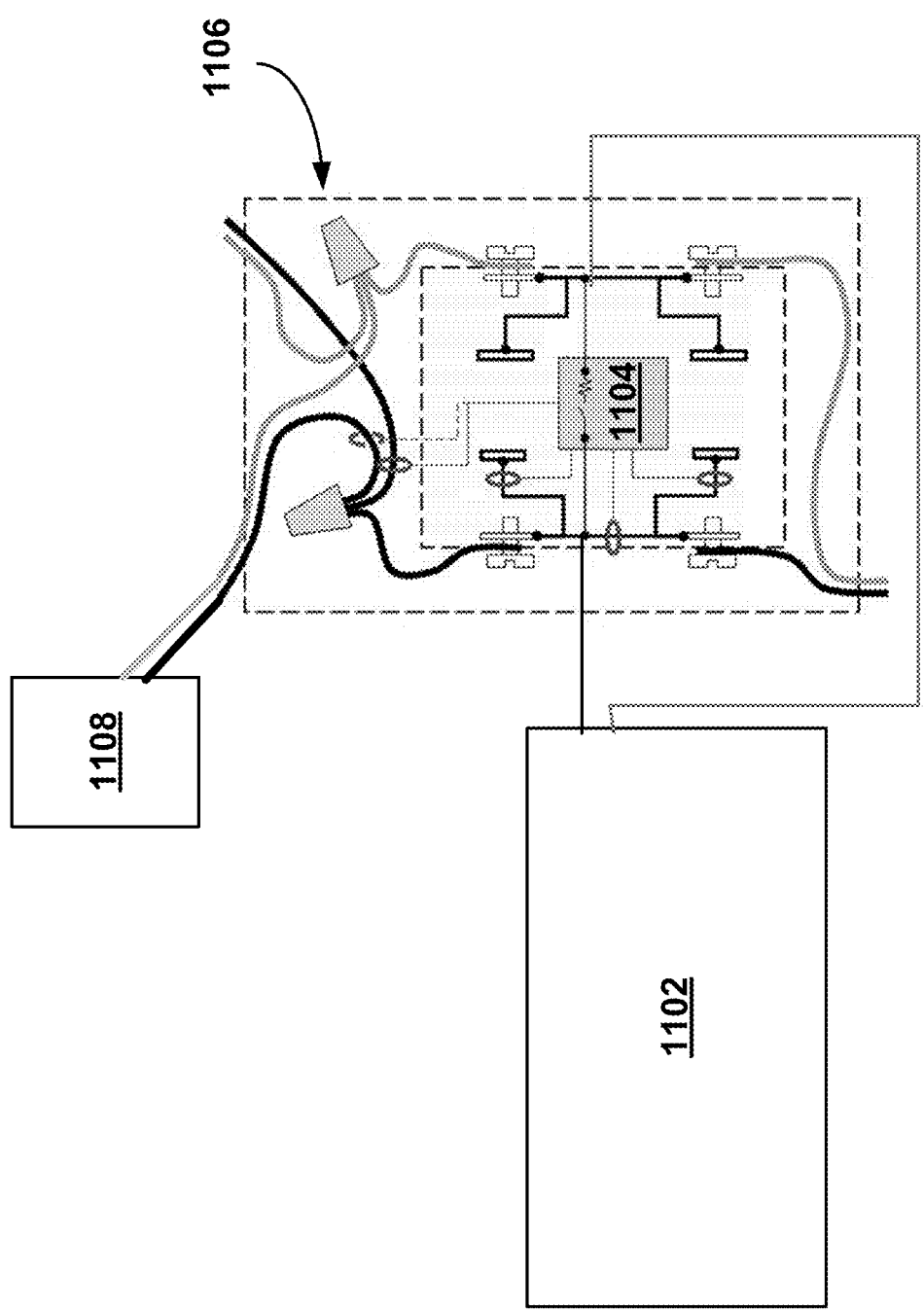
FIG. 11 illustrates an example of node electronics in communication with a faceplate through auxiliary contacts.

FIG. 10 illustrates such a node 1002 including more than the above referenced 3 contact points, e.g. 5 contact points 1004 that allow for an additional two contacts to supply power of greater than 30 volts and bandwidth greater than that which may be available in the node electronics. Depending on a particular appliance's need, it may have its own power supply and/or communication system and use the node primarily as an interface. FIG. 11 illustrates an exemplary schematic diagram wherein power is provided to an appliance 1102 through a node, e.g. an outlet, 1106, bypassing the power supply of the node electronics 1104. It is also envisioned that in any of the previous scenarios, that the communication and power could be achieved through means other than physical contacts, for instance, through inductive coupling. It is also envisioned that a power and communication connection could be established with a node through appliance contacts that are configured to make an electrical connection with standard outlet or switch screw type lugs or flying leads from the appliance to the screw type lugs. In this fashion, appliances can achieve power and communication with existing switch and outlet designs that may or may not have the electronics capabilities and electrical contacts described herein.

As alluded to above, an exemplary system in which the above devices may be incorporated may include a system for mapping a wired network containing nodes which may be configured to identify themselves to a central processor or identify themselves with respect to one other due to their own distributed processing capability. The connection of the nodes may then be determined with respect to other nodes from which an electrical wiring diagram may be generated. For example, a central processor (e.g. a computer), which may coordinate and collect node communications and information, may be connected or integrated into a breaker panel or any location within any given building, or even positioned at a remote location. A visual display may then be provided to analyze/review the electrical system, including the electrical wiring diagram, usage for given circuits or rooms, and/or usage for specific nodes. Furthermore, any aspect of this information regarding the electrical system may be forwarded to a remote location and accessed, e.g., over the Internet or any desired information network.

Figure 12:
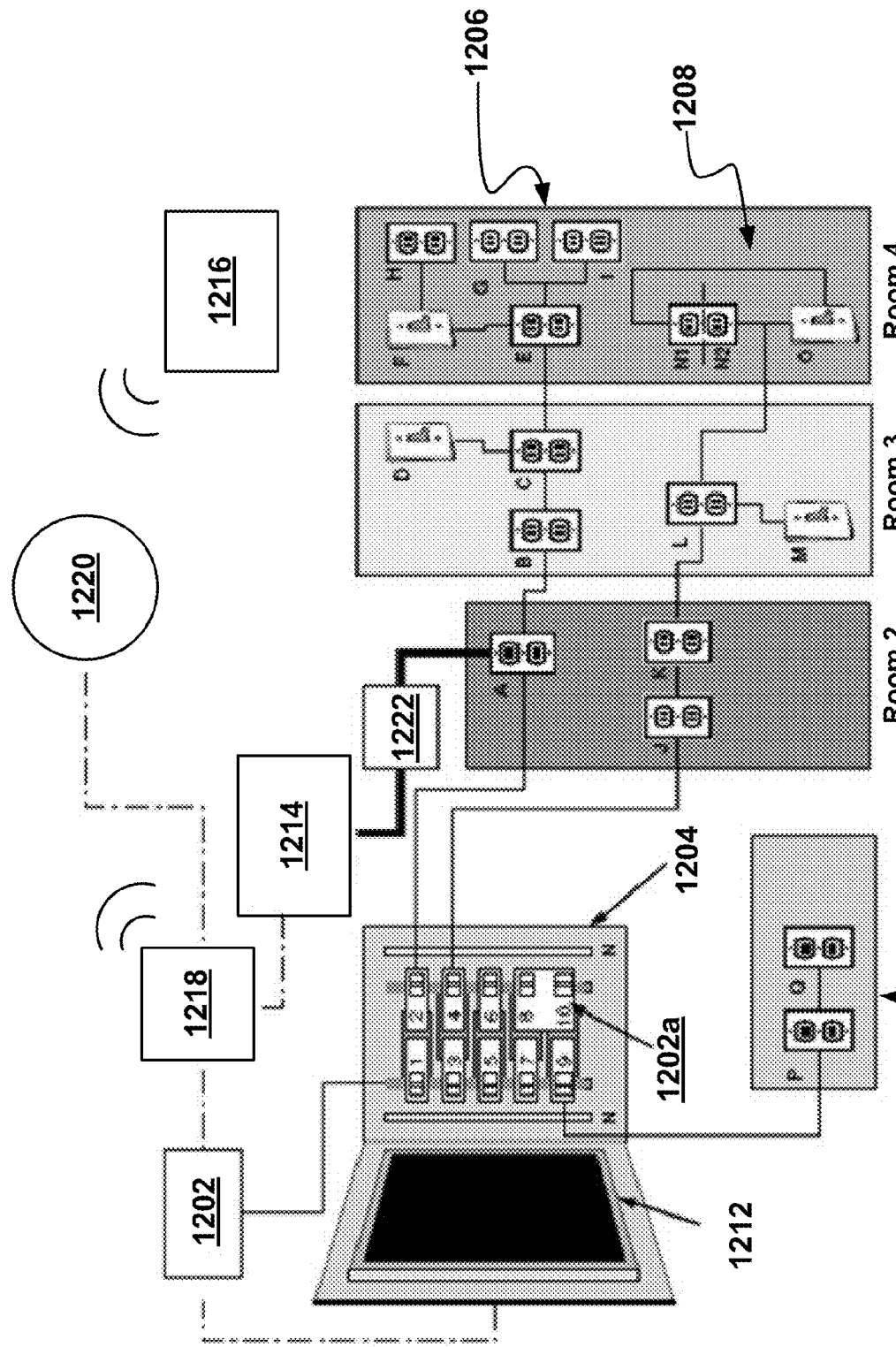
FIG. 12 illustrates an example of a system configured to provide mapping.

An overview of an example of the system architecture contemplated herein is illustrated in FIG. 12. The system may include a central processor 1202, and/or distributed processing capabilities, an electrical distribution system or power supply (e.g. as a breaker box 1204) and a series of nodes A-Q located along three circuits 1206, 1208 and 1210 connected to breaker nodes #2, #4 and #9 and other breaker nodes #1, #3, #5, #6 and #7. The nodes may include electronics configured to monitor power usage and other conditions in the nodes and signals sent between the nodes and/or the central processor 1202. The processor, or portions of its functions, may be remotely located and communicated via wireless techniques, phone, internet, power line or cable. The processor may also interface with the network at any of the node locations.

A processor as referred to herein may be any device or devices which may be configured to carry out one or more of the following: coordinate communication, control directional events at the nodes, run algorithms to determine topology and analyze power, as well as provide external communication to other devices through means such as phone, ethernet, internet, cable, wireless, etc. The processor may communicate over the electrical distribution system, be integrated into the system or located remotely. In one example, a processor 1202*a* may be positioned in a circuit breaker position within a breaker box (1204) and may communicate to multiple phases simultaneously. In another embodiment, the functions of the processor are handled on a distributed basis by computational power and memory available at each node.

In addition, reference to distributed processing herein may be understood as a technique of processing in which different parts of a program may be run on two or more processors that are in communication with one another over a network (as noted below, e.g., between two or more nodes). Accordingly, each node may be aware of at least one other node to communicate with, such that the plurality of nodes may be linked. Coordinating may be done on a cooperative basis, for example for synchronization (as explained more fully below) any node could establish a relative synchronization with any other, one pair at a time, until all of the nodes are synchronized. A similar process may occur for mapping (discussed more fully below). In addition, when data is required to be read for the system the request for information could be sent among the nodes until one or many nodes may respond.

As noted above, "nodes" may be understood herein as switches, outlets, breakers, connectors, junction boxes, lighting loads and many other hard wired devices or locations where connections may be made, and may include electronics at these locations for communicating with the system and monitoring conditions. The term "node" may also be applied to devices which are plugged into a circuit if they are so enabled with a means for communicating with the system. The node may be associated with other nodes in a circuit or with a given location in a building. Furthermore, the node may provide additional functionality, such as providing power to an outlet under specific conditions, e.g. all prongs being inserted simultaneously into an outlet.

Referring back to FIG. 12, each of the three circuits 1206, 1208, 1210 depicted may contain a variety of switches and outlets which may provide routing of power throughout a building. For example, breaker #2 provides power to outlets A, B, C, E, H, G and I, and also to switches D and F. It may be understood that electrical devices and loads within a building are electrically wired in one or more circuits. A circuit may be understood as a path for the flow of current, which may be closed. Circuits may also be wired in "parallel." When wired in "parallel," disconnecting one device will not prevent the others from working. However, it may be appreciated that some devices may be wired in "series," wherein the devices may be dependent on other devices to provide power through an electrical connection in the device itself. In other words, disconnecting an upstream device will disable downstream devices. For example, on breaker #2, power to outlets E, G, I, H and switch F in Room 4 may be dependent on outlets A, B and C, i.e. if any of these are disconnected, outlets E, G, I, H and switch F in Room 4 may not have power since each of outlets A, B and C use an electrical bus in their housings to provide power to the next outlet. However, outlets G and I are not dependent on one another and both may maintain power if the other is disconnected.

Furthermore, it may be appreciated that the nodes may be connected to a common bus, or pathway, i.e., the circuit. As understood herein, a common bus may be understood as providing electrical continuity between at least one connection on each of the nodes. Furthermore, it may be appreciated that one or more additional common busses may be provided for the nodes.

Upon direction from processor 1202, which may be prompted by a user action into the interface 1212, each of the nodes included in the outlets, switches, etc., may be configured to create and detect a node electrical signal. The signal may be a directional and detectable electrical signal that may be utilized to map the nodes. That is, a node's location in a virtual electrical wiring diagram may be determined by creating a detectable signal at the node, which can be relayed to identify its position to a user in such a diagram. The directional electrical event may be understood as an electrical signal that may be detected differently by upstream nodes as compared to downstream nodes. Upstream nodes may be wired electrically in the path of flowing current proximal to the primary power source relative to other nodes. Downstream nodes may be wired electrically in the path of flowing current distal to the primary power source relative to other nodes. For example for node E, nodes A, B, C and #2 (breaker) may be considered upstream nodes, and nodes F, G, H and I may be considered downstream nodes.

Depending on the signal method used, node D may or may not be considered an upstream node. For example, if the signal is generated by node E by creating an incremental electrical load, node D does not detect the flow of power. If the signal generated by node E is a voltage signal, node D may see the signal and be considered upstream. The algorithm for creating a map of the network (see below) can take into account what kind of signaling method is utilized. An incremental load may be understood as a current draw, in addition to those otherwise present in the circuit, with a sufficiently high source impedance that may have a relatively minimal effect upon the voltage on the wiring; such a signal may be at a lower frequency. A voltage signal may be understood as a power source with a sufficiently low source impedance that it is detectable as a change in voltage on the wiring; such a signal may be at a relatively higher frequency.

Each node may have a set of other nodes that are upstream and downstream from it. An accumulated table of information about which nodes are upstream and downstream from other nodes may then allow for the creation of an electrical wiring diagram. Some nodes may share the same set of upstream and/or downstream nodes, because they are electrically equivalent, for example, in FIG. 12, nodes G and I. The processor, such as central computer 1202 may coordinate the sequence of directional events at each node, collect information regarding which nodes detect electrical events of other nodes, and develop a wiring diagram. The processor may also collect information regarding power usage and other data at each node and may compile the data for transmission through wireless or wired means for local viewing and interaction, e.g., interface 1212, another computer 1214 connected to the system, or a mobile computer 1216, which may wirelessly communicate with a router 1218 in either direct or indirect (as illustrated) communication with the system, or transmission to a remote location 1220, such as over the internet. This information may also be retrieved directly through the power network through an appropriate interface 1222.

In an illustrative embodiment, a directional electrical event may be created by a switched known load at each node. By using the power monitoring devices within each node, and by measuring the power that flows through each node, each upstream node may detect the load of a downstream node and a wiring diagram may be created. This process may be done in the presence of other loads, i.e. the switched load may be incremental to existing loads. A further enhancement includes a node having a remote current sensor (e.g. tethered) for measuring current that flows through an electrical or junction box but not through the device itself (described further herein). Using remote current sensors, outlets that would otherwise be electrical "equivalents" may be physically ordered in the wiring diagram (e.g., all nodes are wired using a pig-tail configuration and do not carry power to other nodes using an internal bus, further discussed below).

Figure 13:
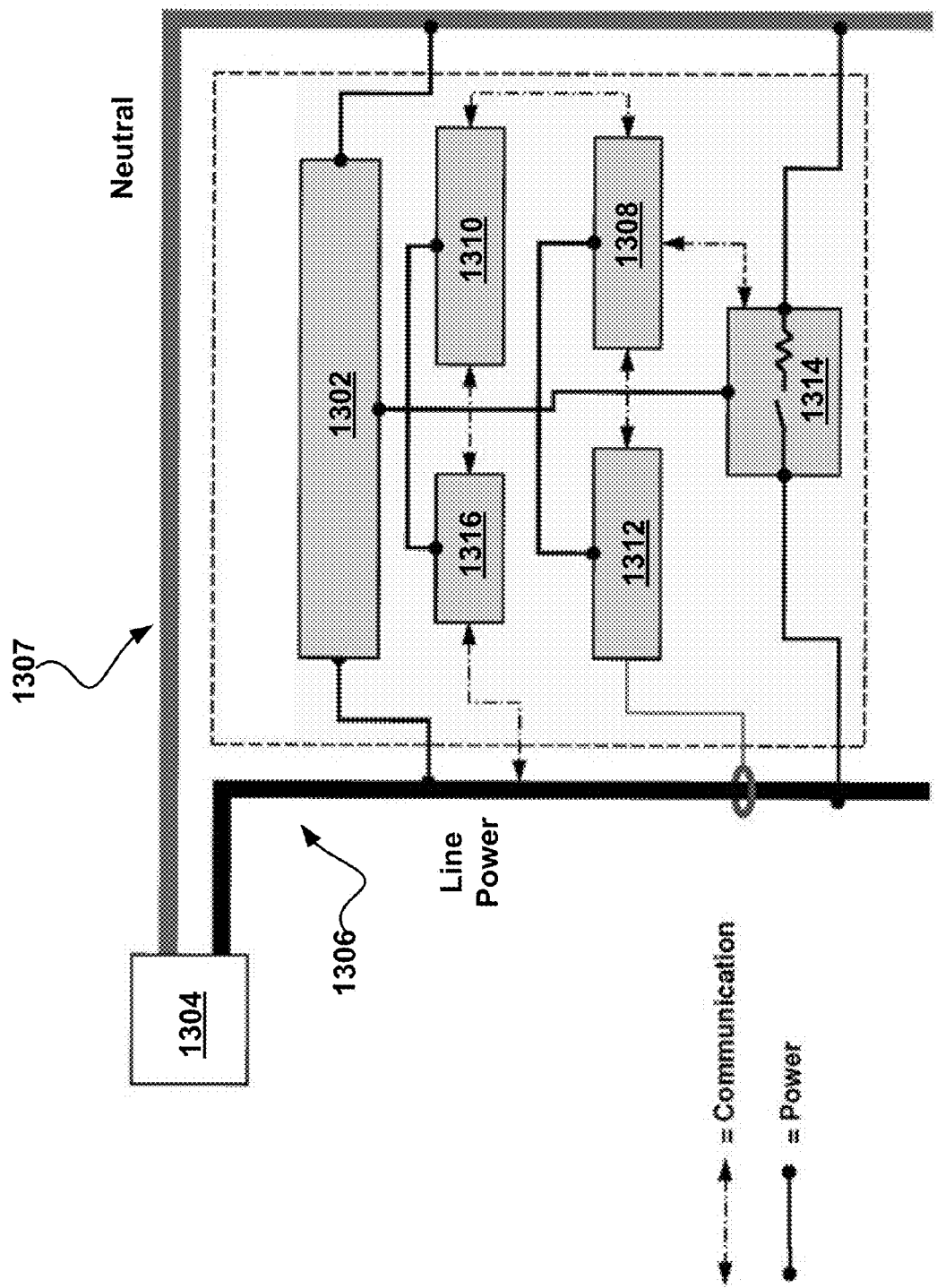
FIG. 13 illustrates an example of node electronics that may be included in a node, such as a receptacle or switch.

The control circuitry or node electronics may be utilized to provide signals to other nodes or to a central processor, sense power usage by the node, and other functions. FIG. 13 is a block diagram of an exemplary version of the electronics associated with a node. The unit may include a power supply 1302, a microcontroller 1308, a communications function 1310, a power measurement function 1312, a switchable micro-load 1314 and a coupler 1316, which enables communication to take place on the power lines.

The power supply may draw power from a power source 1304 though power line 1306 with a return path for the current, neutral line 1307. The power supply may be a low voltage power supply (e.g. less than 30 volts), and may be configured to transform the power from AC to DC, and reduce the voltage to a level acceptable for the micro-controller, the switchable micro-load and communication functions. In addition, the power supply may include a battery, which may be charged with energy available between line power 1306 and neutral 1307. A micro-controller is illustrated at 1308 for controlling the actions of the unit based on logic inputs. The micro-controller may also include arithmetic elements, as well as volatile and/or non-volatile memory. In addition, the micro-controller may include identifier information for identifying the node, such as a serial number stored in the controller.

A communications function 1310 may also be provided. The communication function may be provided on the micro-controller as input and output interfaces. The communication function may create and receive node electronic signals which may be interpreted by the various electronics within the node, other nodes or in a central processor with which the node may communicate. Signals received by the node may be filtered from and to the power line by a coupler 1316. The coupler 1316 may allow for one or more communication signals to be sent over the power line 1306 and may utilize existing communication standards.

A power measurement function 1312 which may measure key aspects of power (current, voltage, phase . . . etc.), may also be integrated into the micro-controller, or communicate therewith. The power measurement function may be facilitated by measuring the magnetic field generated by the current and/or the voltage across the node. While it may be appreciated that power may not be measured directly, power may be determined by measurement of both current and voltage. Sensors for performing these functions, e.g., measuring current, phase or voltage, may include Hall effect sensors, current transformers, Rogowski coils, as well as other devices.

A switchable "micro-load" 1314 may also be included. The switchable "micro-load" may create a directional and detectable electrical event. The micro-load may be activated when directed by the microcontroller, such as during mapping or other system functions. The powered micro-controller may direct the switchable micro-load to trigger, creating a detectable signal for upstream nodes—i.e. those nodes required to transmit power from the source.

In addition to the above, the node electronics may also include a number of other functions. For example, the electronics may include a temperature sensor (or other environmental sensors). Furthermore, the electronics may also provide user-detectable signals, such as audio or optical signals for alerting a user to the physical location of the node.

The node may also include a means for a user to convey information to it, for example a button. When said button is operated by a user it may cause a communication to be sent identifying the node to which this operation occurred. This may provide another means of correlating a node's physical location with respect to an electronic representation of the system wiring.

Figure 14:
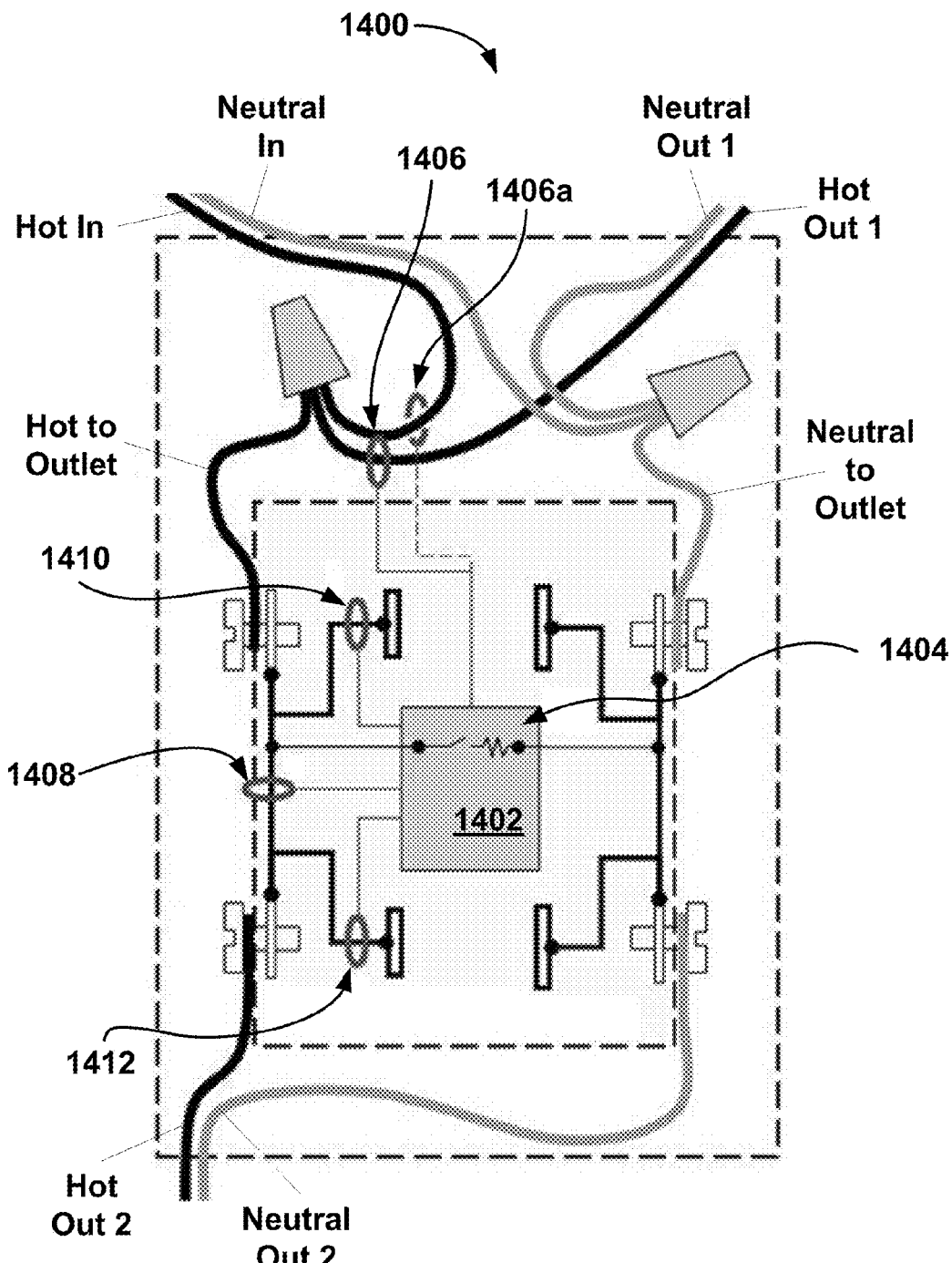
FIG. 14 illustrates an example of node electronics provided in a receptacle.

The node wiring and electronics may be configured based on the node type. For example, FIG. 14 is a diagram of an exemplary outlet node 1400 (which represents a duplex socket) and associated wiring. The outlet may include power provided through a "hot wire" via the "Hot In" wire and to the individual sockets via wire "Hot to Outlet." Power may also pass through the outlet via "Hot Out 1" and "Hot Out 2." In addition, a neutral may be provided to the outlet "Neutral In" as well as through the outlet and out of the outlet, "Neutral Out 1" and "Neutral Out 2," respectively. The electronics 1402 may include a switchable micro-load 1404. Current sensor 1408 may enable measurement of the power flowing through the node, a feature which may enable mapping, and current sensors 1410 and 1412, may measure power drawn from their respective sockets. In addition, external current sensors, 1406 and 1406a, may be provided, either of which may monitor power passing through the electrical box that does not pass through the node itself. Accordingly, it may be appreciated that the current passing through the node, being drawn from the node and flowing around the node may all be measured. These sensors may allow for a better understanding of the physical location of nodes with respect to one another. In situations where the two sockets of a duplex receptacle are wired separately, a single set of node electronics may be used for both monitoring and mapping each receptacle independently.

Figure 15:
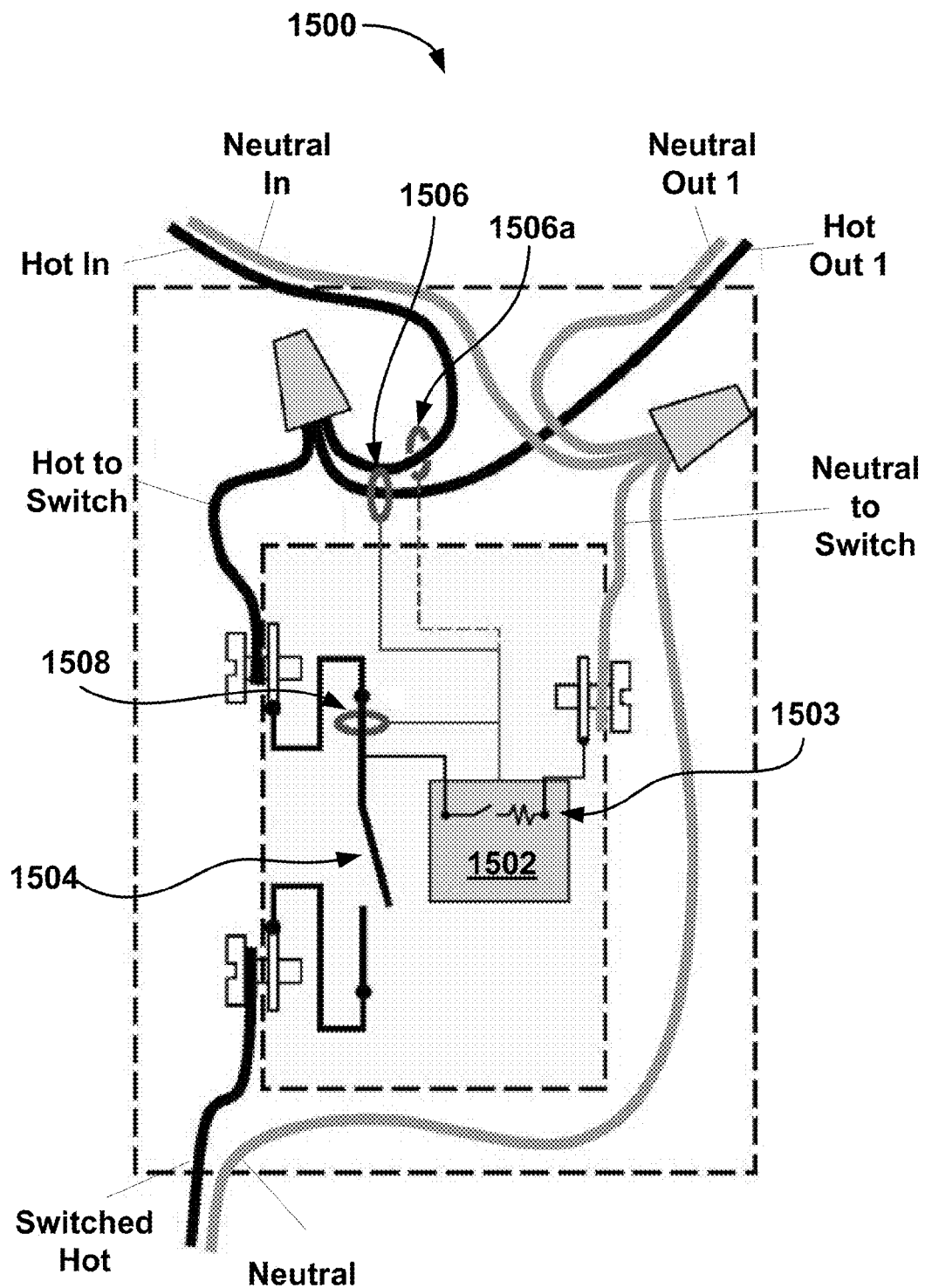
FIG. 15 illustrates an example of node electronics provided in a switch.

FIG. 15 is a diagram of an exemplary 2-way switch node 1500 and its associated wiring, i.e., "Hot In," "Hot Out," "Hot to Switch," "Switched Hot," as well as "Neutral In," "Neutral Out," "Neutral to Switch," etc. As seen, the electronics 1502 may include a switchable micro-load 1503 for the switch 1504. Current sensor 1508 may enable measurement of the power drawn through the switch. The electronics may also include external sensors 1506 and 1506a, which may monitor power which runs through the electrical box, but not the node, allowing for a better understanding of the physical location of nodes with respect to one another. Note that the switch may include a neutral connection, which allows the system electronics to be powered for its various activities. Other schemes for drawing power without the neutral connection are contemplated. For example a current transformer may be used, which may pull power from a single wire when the switch is closed and under load. This power may be used to drive the node electronics and/or recharge a battery to power the node electronics for periods when power is not flowing. In addition, a small amount of power may be drawn from line voltage and returned to ground, in such a fashion and amount that it does not present any danger to people or property (and also so that any GFI in the circuit does not unintentionally trip). This configuration may be used to charge a battery, which in turn may drive the electronics.

In another example, power may be drawn in series with the load, allowing a relatively small current to flow through the node when it is notionally off, in a configuration similar to existing lighted switches. Power drawn by this method might be used to power the node electronics and/or charge a battery to power the node electronics in conditions that do not allow for power to be provided.

Figure 16:
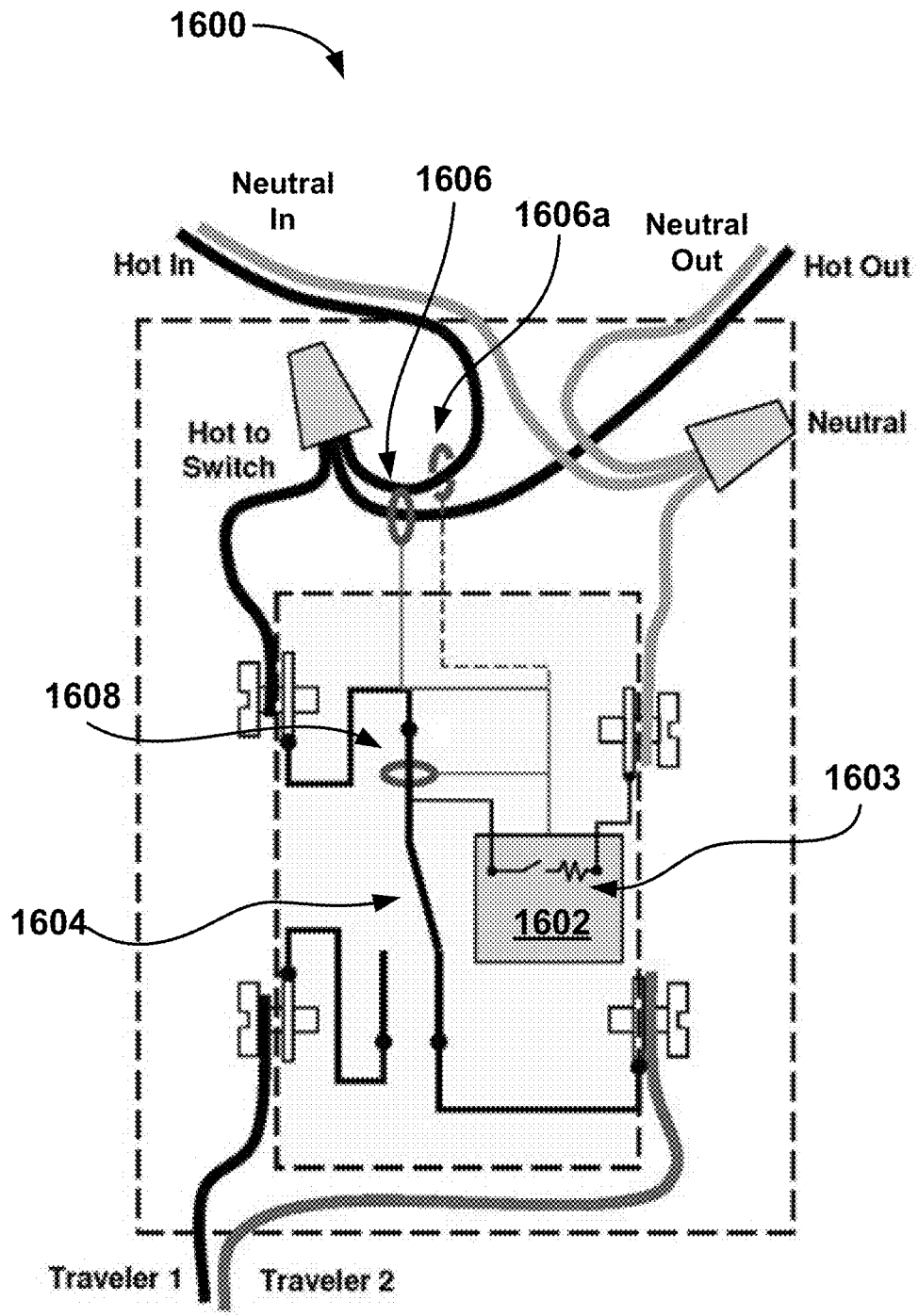
FIG. 16 illustrates an example of node electronics provided in a three-way switch.

FIG. 16 is a diagram of an exemplary 3-way switch, wherein some of the characteristics are consistent to those described with respect to FIG. 15. More specifically, the electronics 1602 may include a switchable micro-load 1603 for the switch. Current sensor 1608 may measure the power drawn from the switch. The electronics may also include external sensors 1606 and 1606a for monitoring power which runs through the box but not the node, allowing for a better understanding of the physical location of nodes with respect to one another. Once again, the switch may include a neutral connection, which may allow the system electronics to be powered for its various activities. Similar methods for powering a 2-way switch in the absence of a neutral may also be applied for a 3-way switch.

Figure 17:
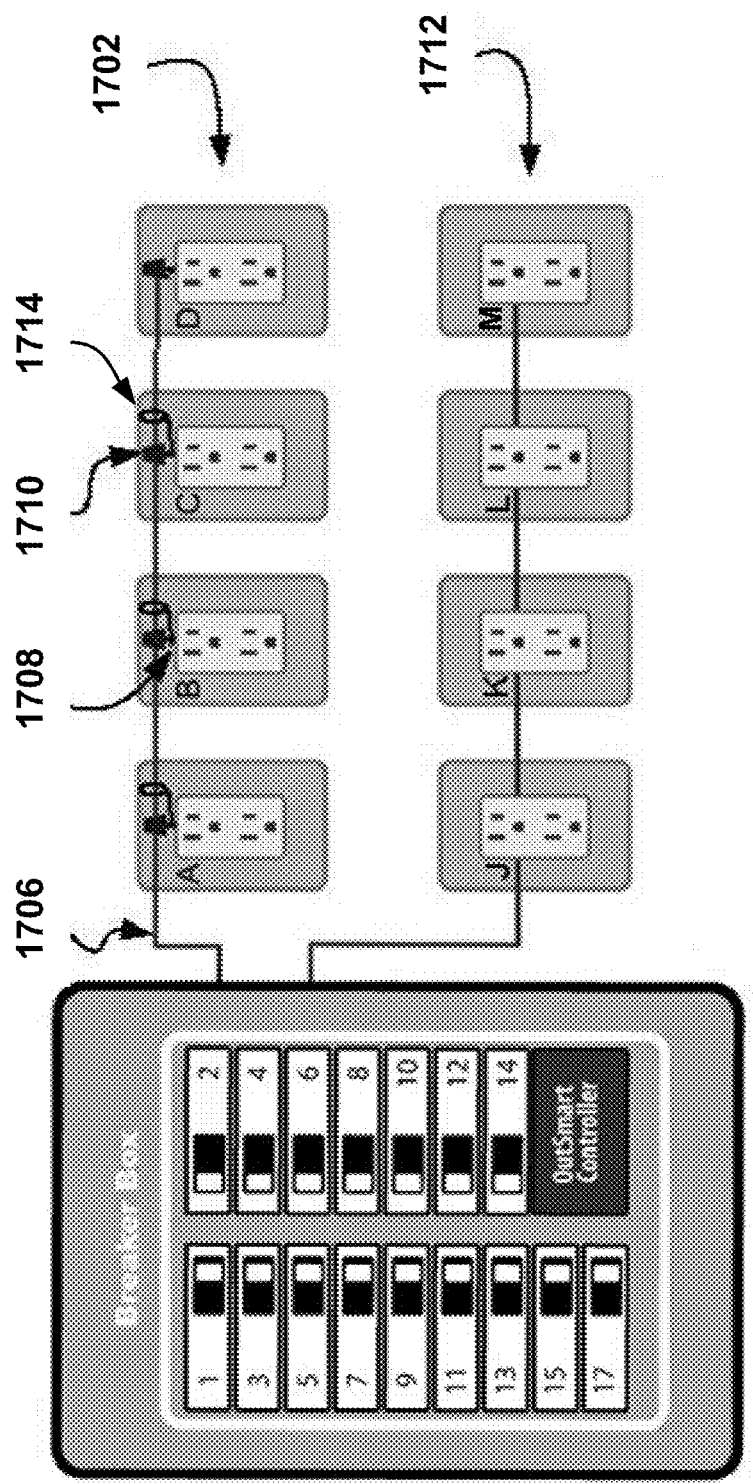
FIG. 17 illustrates an example of "pig tale" versus through wiring.

FIG. 17 shows the difference between what is termed a "pig-tail" (or parallel) configuration 1702, and a "through" or series configuration 1712. In a "pig-tail" configuration power may be brought into an electrical or junction box A-D from a main line 706 and a short wire 1708 is connected to the incoming wire and the outgoing wire (through twist on wire connector 1710, for example) to power a nodes A-D. This means that if any outlet/node is disconnected, power may continue to be provided to other nodes. This may be in contrast to through wiring 1712, where a conductive pathway within node J may be responsible for powering subsequent nodes K, L and M, (i.e. disconnecting power to node J will remove power from nodes K, L and M). In the pigtail configuration, external sensors (e.g. 1714) may be employed, which may indicate that A was wired before B, which was before C, which was before D. It should therefore be understood herein that node A is considered to be electrically upstream of, for example nodes B, C and D. For outlets J through K, the current sensor within the node may determine the order of the outlets relative to one another. Electrical junction boxes may also be configured with suitable electronics, so the monitoring and mapping information may be done by the box, which would then effectively be a node.

Figure 18:
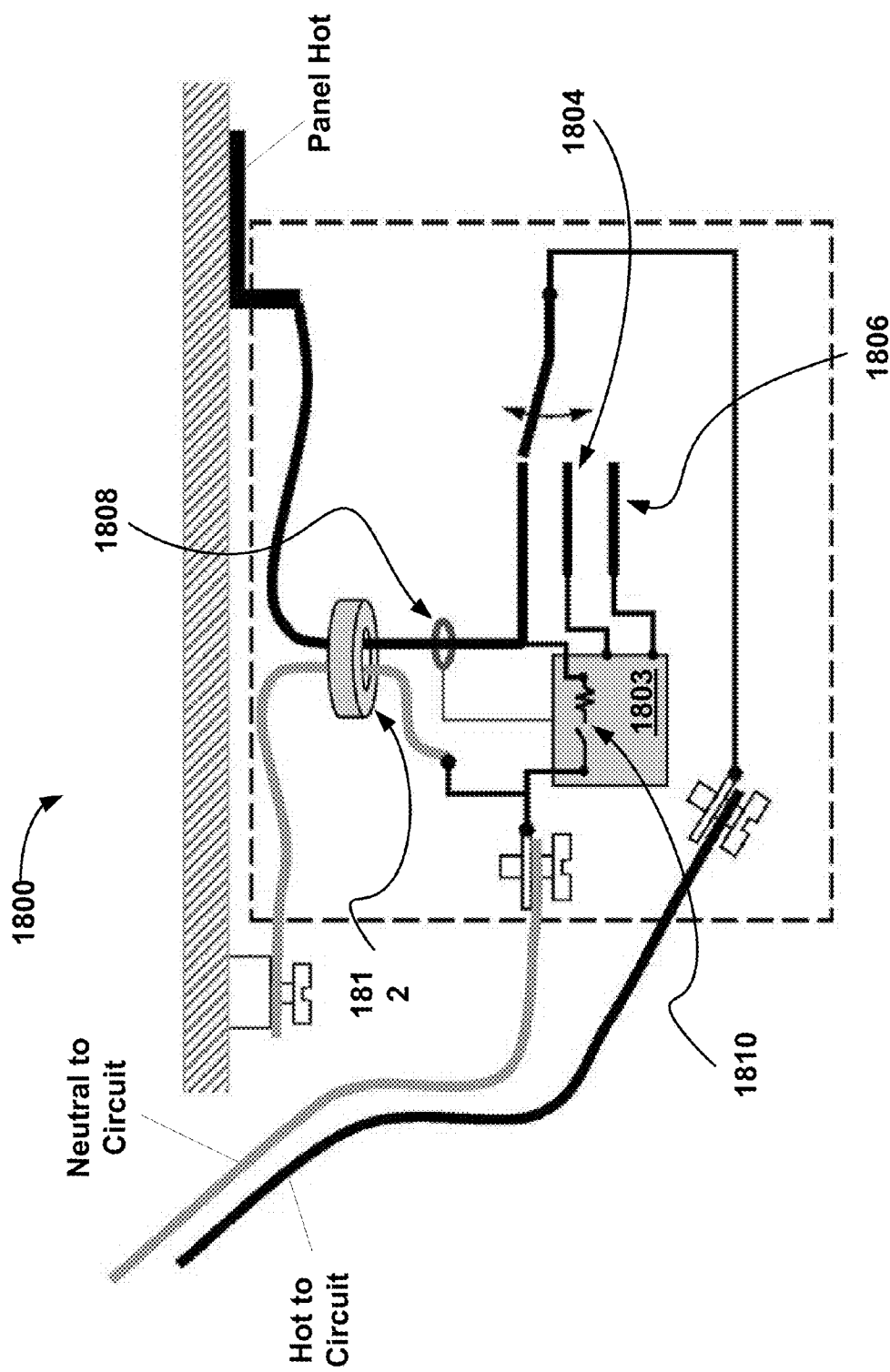
FIG. 18 illustrates an example of node electronics provided in a breaker.

FIG. 18 is a diagram of an exemplary circuit breaker including system electronics 1803. The breaker may receive power from the circuit panel through a "hot" wire "Panel Hot." The breaker may provide power to a circuit "Hot to Circuit" and a neutral "Neutral to Circuit." Like other nodes, it may apply a switchable load 1810 which may allow itself to be identified in the network. The circuit breaker node may also include a sensor 1808 to enable power measurement through the breaker. Like other breakers, it may have the ability to switch off in the case of an over-current, ground fault and/or arc-fault condition or other conditions which may be deemed unsafe. For example, the breaker may include a GFI sensor and/or other electronics 1812. However, when the breaker trips and removes power, it may continue to provide communication with its circuit and the rest of the system. The individual nodes on the circuit may be self-powered including batteries, capacitor or super-capacitor, etc., so that they may communicate information to the breaker during a fault condition. The circuit may then report to the breaker and then to the processor (central or distributed) what may have caused the fault and what actions should be taken before turning the circuit back on. Among many possibilities, these actions may include unplugging a load (appliance) or calling an electrician.

In one embodiment, the breaker may switch to a communications channel 1804 where nodes, running on residual power (provided by a battery or capacitor, etc.) may communicate their status. In another exemplary embodiment, the breaker may connect to a power limited channel 1806 (low voltage and/or current) to continue to provide small amounts of power to the circuit for communication. This power could be applied as a low voltage supply between line and neutral or a low voltage supply between line and ground, at a level that does not present a danger, and assuring the power draw does not cause any GFI in the circuit to trip. The breaker may be configured to enter either a communications or low power mode via a remote command to interrogate the system and identify problems. Alternatively, the nodes may be able to communicate important information about the events leading to a fault condition before the breaker trips.

It may be appreciated from the above, that also contemplated herein is a mechanism for nodes to communicate their state to the system. State may be understood as the current condition of a node and/or its adjustable parameters, e.g., whether a switch is on or off, whether power is being drawn from the node and in some cases, the extent of the power being drawn from the node. For instance, if a light switch, such as those referred to in FIGS. 15 and 16 did not have a neutral connection, but was powered through some other device (e.g. inductive or battery), when turned on it would announce itself to the system and its state (of being on) and the system could detect that a load appeared through the switch and other upstream nodes, thereby establishing the switch's position in the network. Effectively, the load may serve as the detectable directional event for the switch. Additionally, if a switch is turned on and communicates its state to the system, and no load or outlet is seen beyond the switch, one may construe some type of problem—e.g. a bulb has failed. Similarly, if the load associated with a switch changes over time, one or more of many light bulbs may have failed. A controlled or switchable outlet, could function in much the same manner described, communicating its state to the system. A dimmer switch, for example, could communicate the level at which it has been set.

Figure 19:
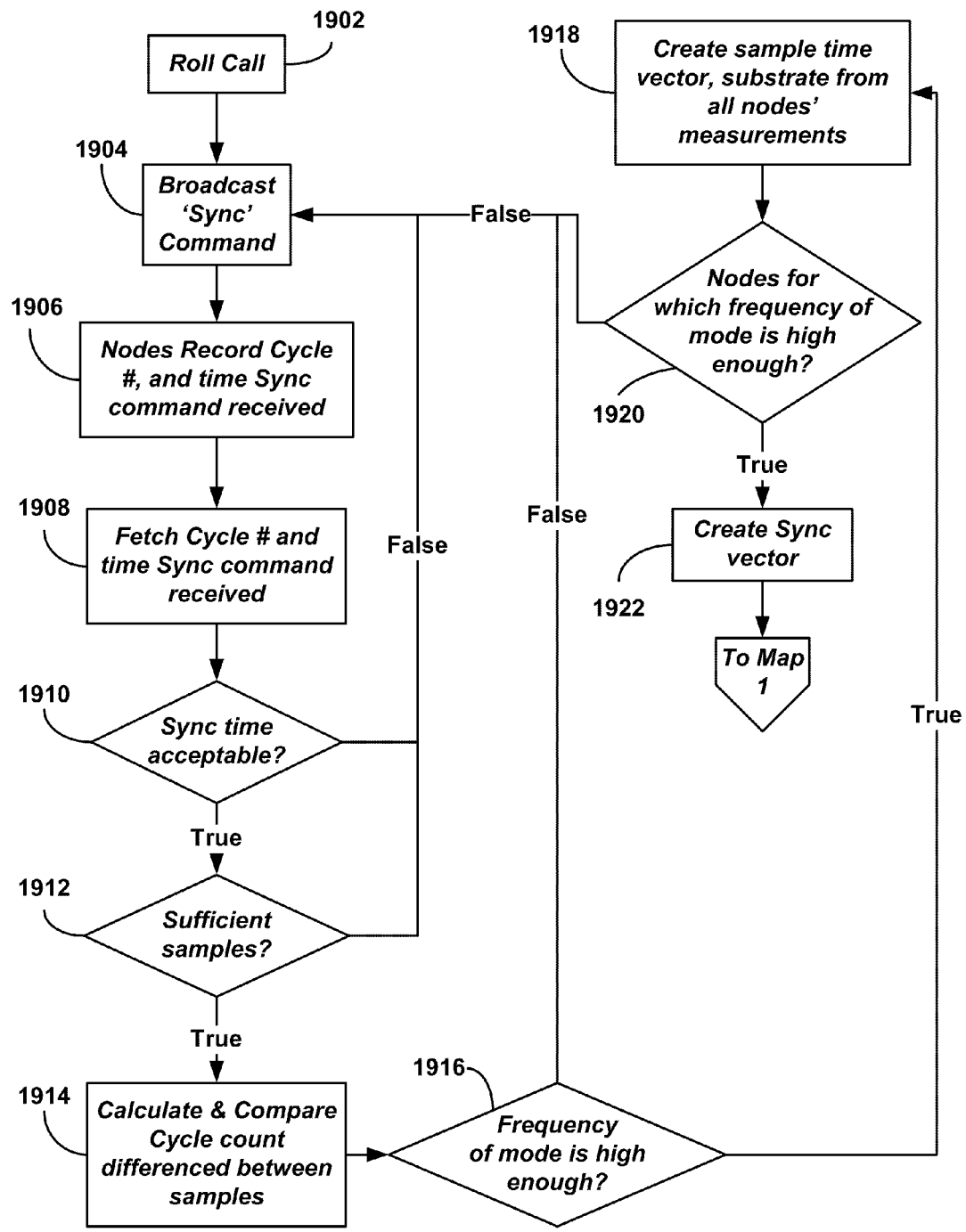
FIG. 19 illustrates an example of a method of synchronizing.

Also contemplated herein is a method for mapping the various nodes and monitoring power usage and other information via communication between the nodes and the processor. The process of mapping the nodes may begin with the individual nodes or the central processor. For example, when a node is powered or reset, or the central processor sends a reset signal as illustrated in FIG. 19 a roll call may be initiated at 1902. Each active node may wait a random period of time and send a message to the processor indicating that it is present. An active node may be understood as a node currently capable of communicating with a processor. Inactive nodes may be understood as nodes currently unable to communicate with a processor (e.g. because they are isolated by a switch which is turned off or are powered only in the presence of a load . . . etc.) and may or may not be accounted for by the processor, depending on whether the node was (previously known to exist and deemed) likely to reappear at some later point in time. When each active node sends a message to the processor that it is present, the message may include descriptive information, such as, identifying information, e.g., a serial number, or the type of node it may be, e.g., switch, breaker, outlet, appliance, etc. The processor may create a list of all the active nodes present on the network at that time, including any descriptive information sent to the processor. In addition, the nodes may include a line cycle counter that may be started when the node is powered up or reset.

Once the system is aware of the active nodes which may be present in the system, the system may synchronize the nodes. The processor may broadcast a 'Sync' command to all nodes at 1904. In one exemplary embodiment, each node may maintain a line cycle counter, which may increment on the positive going zero crossing of the line voltage waveform. Upon receipt of the sync command, the node may save a copy of the counter as C, and the time since the last increment, i.e., on the last or previous positive going rising edge of the line voltage wave form as R at 1906. The node may then provide the values of C and R to the processor upon request, such as a Fetch Cycle at 1908. If R is reported as being too close to the zero crossing time for a significant number of nodes, then sync times may be found to be unacceptable and the set of measurements may be rejected at 1910.

The 'Sync" operation may be performed a number of times until sufficient samples are collected, as decided at 1912. For a given number of nodes n and a given number of samples q, the values of C collected may be saved as an array according to the following:

$$C[m][p],$$

wherein m is an index of the node (from 1 to n), and p is an index of the sample set (from 1 to q). It may be appreciated that the data might contain some errors. The following table includes an exemplary dataset for purposes of illustration, wherein n=5 and q=6, as follows:

| C[m][p] | Time Sample p | | | | | |
|---|---|---|---|---|---|---|
| Node m | 1 | 2 | 3 | 4 | 5 | 6 |
| 1 | 773 | 1157 | 1260 | 1507 | 1755 | 1846 |
| 2 | 719 | 1102 | 1205 | 1452 | 1699 | 1791 |
| 3 | 773 | 1157 | 1259 | 1507 | 1754 | 1846 |
| 4 | 598 | 984 | 1085 | 1332 | 1579 | 1671 |
| 5 | 530 | 914 | 1017 | 1263 | 1511 | 1602 |

From the array, a set of differences may be calculated at 1914 according to the following equation:

$$\Delta C[m][p]=C[m][p]-C[m][p-1]$$

For example, based upon the same data the following results may be obtained:

| $\Delta C[m][p]$ | Time Sample differences p | | | | |
|---|---|---|---|---|---|
| Node m | 2-1 | 3-2 | 4-3 | 5-4 | 6-5 |
| 1 | 384 | 103 | 247 | 248 | 91 |
| 2 | 383 | 103 | 247 | 247 | 92 |
| 3 | 384 | 102 | 248 | 247 | 92 |
| 4 | 386 | 101 | 247 | 247 | 92 |
| 5 | 384 | 103 | 246 | 248 | 91 |

The mode (most common value) for all m may then be calculated at 1916 for each value of p according to the following equation:

$$\Delta T[p]=\text{mode of } \Delta C[m][p]$$

across all values of m, for each value of p. For example, based upon the same data, the following may be observed:

|        | Time Sample difference p |     |     |     |     |
|--------|-----|-----|-----|-----|-----|
| ΔT[p]  | 2-1 | 3-2 | 4-3 | 5-4 | 6-5 |
| Sample Vector | 384 | 103 | 247 | 247 | 92 |

The series may be summed, where T[1] may be assumed to be 0, using the following equation:

$$T[p]=\Delta T[p]+T[p-1] \text{ for } p \text{ from 2 to } q.$$

For example, based upon the same data:

|        | Time Sample p |   |   |   |   |   |
|--------|---|-----|-----|-----|-----|------|
| T[p]   | 1 | 2   | 3   | 4   | 5   | 6    |
| Vector | 0 | 384 | 487 | 734 | 981 | 1073 |

If the mode does not represent a large enough proportion of the nodes at 1916 for any sample then the sample may be rejected from T and a more sync commands may be sent. Where the mode represents a sufficient portion of the nodes at 1916, another set of differences may be calculated at 1918, wherein $$\Delta D[m][p]=C[m][p]-T[p].$$

For example, based upon the same data:

| ΔD[m][p] | Time Sample p |     |     |     |     |     |
|----------|-----|-----|-----|-----|-----|-----|
| Node m   | 1   | 2   | 3   | 4   | 5   | 6   |
| 1        | 773 | 773 | 773 | 773 | 774 | 773 |
| 2        | 719 | 718 | 718 | 718 | 718 | 718 |
| 3        | 773 | 773 | 772 | 773 | 773 | 773 |
| 4        | 598 | 598 | 598 | 598 | 598 | 598 |
| 5        | 530 | 530 | 530 | 529 | 530 | 529 |

The mode for all p may be calculated at 1920 from each value of m, according to the following equation:

$$D[m] = \text{mode of } \Delta D[m][p]$$

across all values of p, for each value of m, wherein D[m] represents the relative cycle value for the nodes internal line cycle counters. For example, based upon the same data:

| D[m] Node m | Sync Vector |
|---|---|
| 1 | 773 |
| 2 | 718 |
| 3 | 773 |
| 4 | 598 |
| 5 | 530 |

Showing that, for example, for node 1, line cycle 773 refers to the same interval of time as line cycle 530 for node 5.

If the mode for any node did not represent a large enough proportion of the samples at 1920, then the node may still be considered unsynchronized, and the operation may be repeated to synchronize any such nodes to the other already synchronized nodes. If the mode did represent a large enough portion of the samples at 1920, then as above, a table of sync offsets may be generated for each node at 1922. It may be appreciated that in repeating the procedure, a synchronized node does not become an unsynchronized node.

After the system is synchronized, the process of mapping the nodes relative to one another can take place. The first practical step in mapping the electrical network is to assign nodes to breakers. Although it is feasible to map the network without using this approach, assigning nodes to breakers first may be more efficient.

Figure 20:
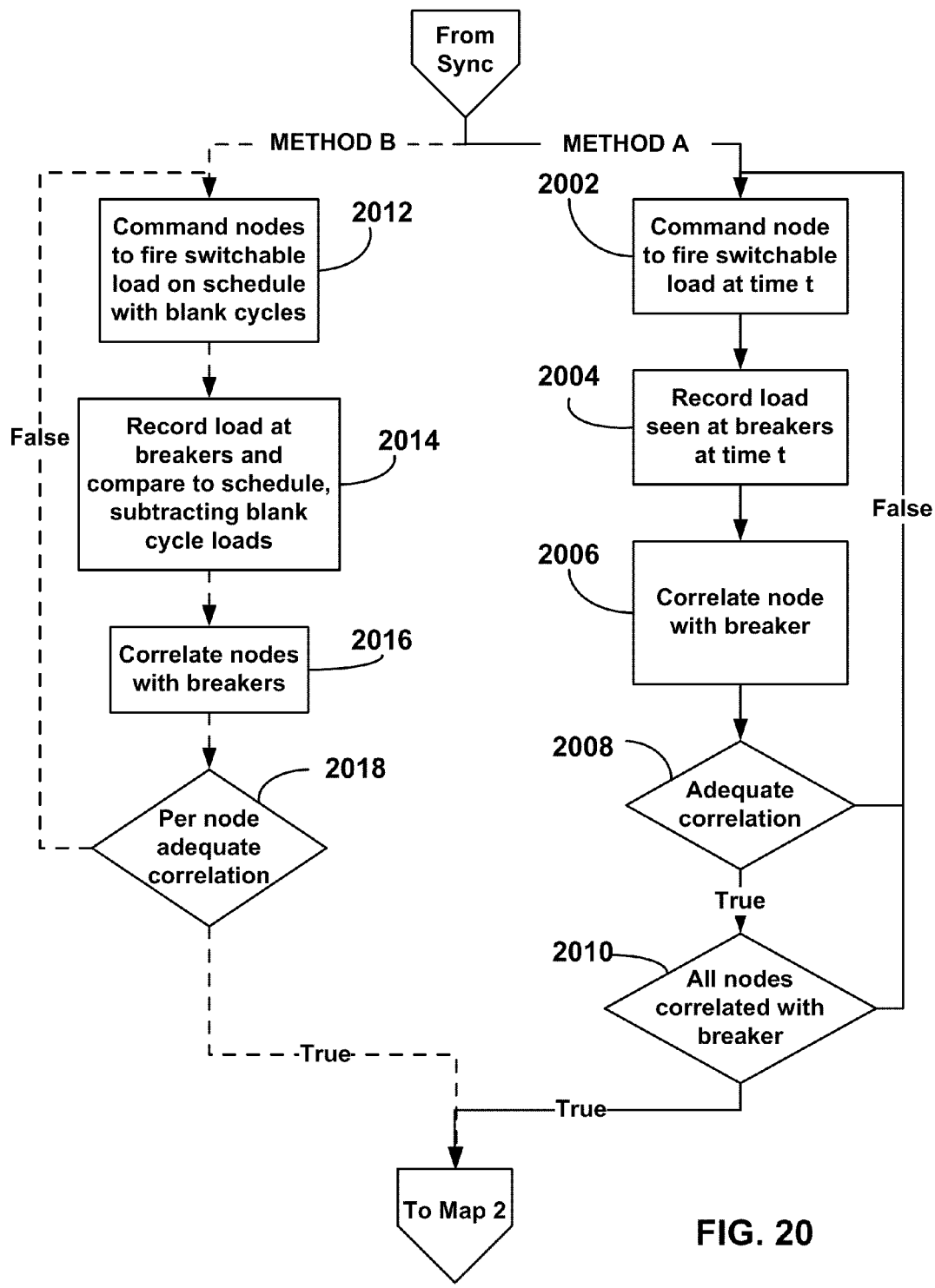
FIG. 20 illustrates an example of a method for associating nodes with a particular circuit.

A first exemplary process of assigning individual nodes to breakers can be done on a node by node basis is illustrated in FIG. 20 as "Method A". A node may be given a command to trigger its switchable load at a known time at 2002. Each breaker monitors the power flowing through it at this time at 2004. The node may then be assigned to any breaker which observed the power flow caused by a node's switchable load at this time at 906.

A second method, illustrated in FIG. 20 as "Method B" may include commanding all nodes to trigger their switchable load on a predetermined schedule, allowing blank cycles to precede and follow each switchable load event at 2012. The blank cycles between switchable load events may desensitize the mapping process to other loads which may be present. Loads seen during the blank cycles (or an average of this load during the blank cycle immediately preceding and following a switchable load event) may be subtracted to better detect the switchable load power draw at 2014. For the duration of the schedule, all breakers are commanded to monitor power flow. After the schedule is complete, information is gathered by the processor to determine which nodes should be assigned to which breakers at 2016.

For example individual nodes may be assigned to breakers according to the following methodology. For a given number of nodes n, and assuming that a micro-load uses energy "e" in one line cycle, all of the breakers may be commanded to measure energy flow on a line cycle by line cycle basis for 2n+1 line cycles, from line cycle a to line cycle a+2n inclusive. All nodes may be commanded to fire their micro-loads at 2012 on different line cycles, node 1 on line cycle a+1, node 2 on a+3, node 3 on a+5 and so on to node n on a+2n−1. Upon completion, the energy measurements may be retrieved from the breakers by the processor at 2014 and then the nodes may be correlated with the breakers at 2016. The energy flow in time cycle a+t in breaker b may be designated E[b][t].

The magnitude of difference in energy flow between a line cycle where a given node p's micro-load was fired, and the average of the adjacent cycles where no micro-load was fired, may then be calculated according to the following equation:

$$D[b][p]=|E[b][2p-1]-0.5*(E[b][2p-2]+E[b][2p])|$$

If, for example, the threshold for determining whether the switchable load observed was 80% of the expected value, then if D[b][p]<0.2e then node p may not be present in breaker b's circuit. Otherwise if 0.8e<D[b][p]<1.2e then node p may be present in breaker b's circuit. If the conditions are not met at 2018, the measurement may be considered indeterminate and may be repeated. It may be appreciated that once all of the measurements and calculations are complete each node may be present under one and only one breaker's circuit (with the exception of breakers wired 'downstream' of other breakers) at 2018.

Figure 21:
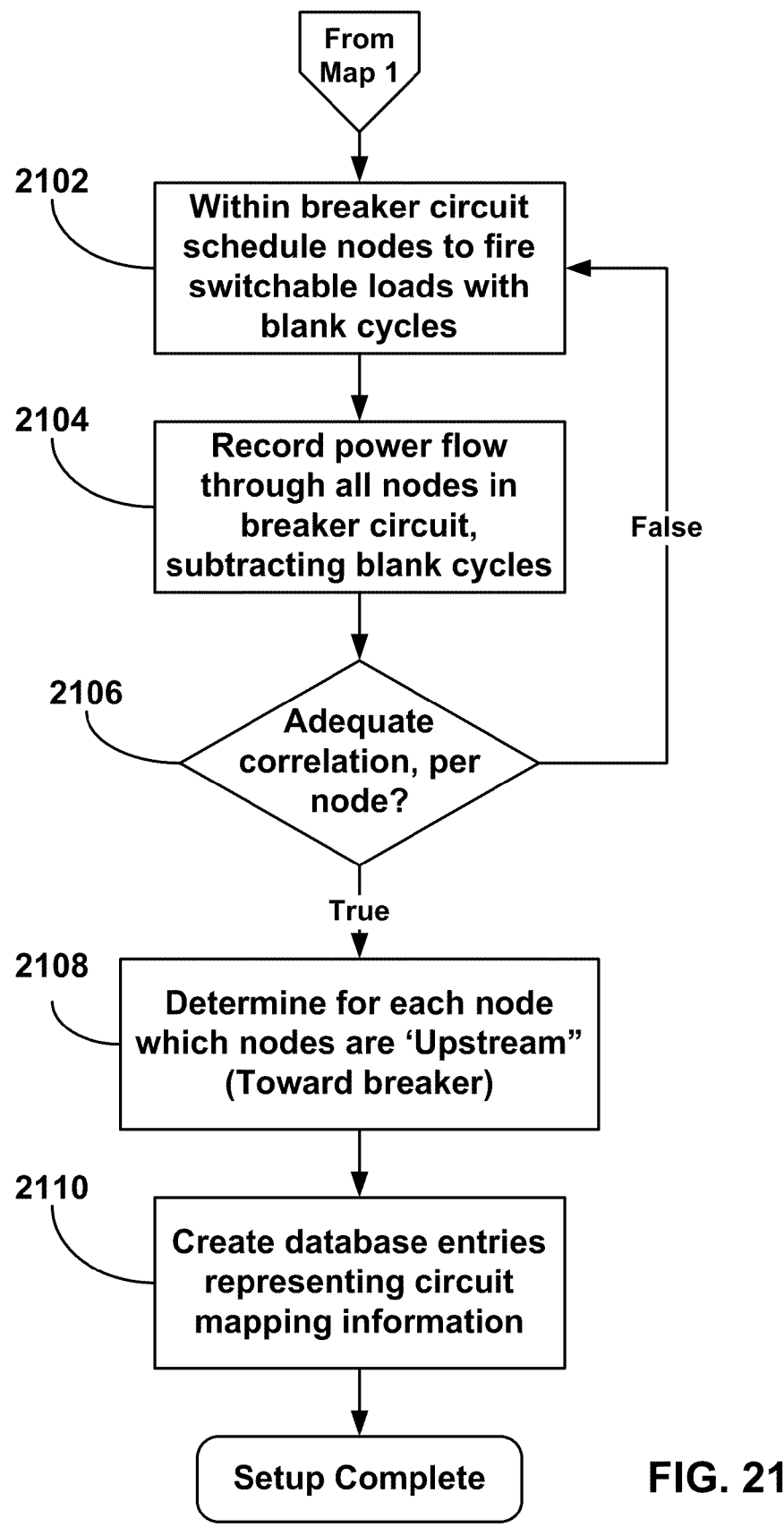
FIG. 21 illustrates an example of a method for mapping nodes within a circuit.

After the nodes have been assigned to a breaker, the next logical step is to map the nodes within the breaker circuits, as illustrated in FIG. 21. The method may include commanding all nodes within the breaker circuit to trigger their switchable load on a predetermined schedule, allowing blank cycles to precede and follow each switchable load event. The blank cycles between switchable load events, as before, may desensitize the mapping process to other loads which may be present. Loads seen during the blank cycles (or an average of this load during the blank cycle immediately preceding and following a switchable load event) may be subtracted to better detect the switchable load power draw. For the duration of the schedule, all nodes within the breaker circuit may be commanded to monitor power flow. After the schedule is complete, information may be gathered by the processor to determine which nodes observe the switchable load of each other nodes, and are therefore deemed "upstream" of them, and thereby determine the circuit topology.

For example, mapping nodes within the breaker circuit may include the following. For a given number of nodes n in a sub-circuit to be mapped, and assuming that a micro-load uses energy e in one line cycle, all of the nodes may be set up to measure through energy flow on a line cycle by line cycle basis for 2n+1 line cycles, from line cycle a to line cycle a+2n inclusive. All nodes may be set to fire their micro-loads at 2102 on different line cycles, node 1 on line cycle a+1, node 2 on a+3, node 3 on a+5 and so on to node n on a+2n−1. The power flow through all the nodes in the breaker circuit may be recorded and upon completion of the measurements the energy measurements may be retrieved from the nodes by the processor at 2104. The measurements from blank cycles may be subtracted from those when loads were expected, as well. The energy flow in time cycle a+t through a node b is designated $E[b][t]$.

The magnitude of difference in energy flow between a line cycle where a given node p's micro-load was fired, and the average of the adjacent cycles where no micro-load was fired, may then be calculated using the following equation.

$$D[b][p]=|E[b][2p-1]-0.5*(E[b][2p-2]+E[b][2p])|$$

If, for example, the threshold for determining whether the switchable load observed was 80% of the expected value, then if $D[b][p]<0.2e$ then node p may not be downstream of node b. Otherwise if $0.8e<D[b][p]<1.2e$ then node p may be downstream of node b. If these conditions are not met, the measurement may be considered indeterminate and may be repeated at 2106.

A determination may then be made as to which nodes may be "upstream" or "downstream" relative to one another at 2108. Once all of the measurements and calculations are completed each node may have a subset of nodes for which it detected the presence of the switchable load, i.e., nodes which are "downstream" of it. A node may be determined to be "downstream" of itself or not depending upon the direction in which it is wired; this may be used to determine wiring orientation of a given node (e.g. whether the line in power is coming in at bottom lug of an outlet or the top lug). Any node "downstream" of no nodes other than the breaker node, may be directly connected to the breaker, with no intervening nodes. In addition, any node detected by such a node and the breaker only may be directly 'downstream' of such detecting node. This process may be iterated until all of the nodes may be accounted for, and hence mapped. Furthermore, in order to represent the circuit topology in the database, the record for each node may contain a pointer to the node immediately 'upstream' of it. Accordingly a database of entries representing circuit mapping information may be created at 2110.

If a particular node is not powered because of a switch in the off condition, it may not be initially mapped. However, once power is enabled to those nodes, they may make themselves known to the network via the processor (such as central computer 1202 of FIG. 12) which may then call for the newly found node or nodes to be synchronized and mapped in a similar manner to the previously described synchronization and mapping methods.

A user may interact with the system through a system interface. Referring back to FIG. 12, a system interface may be present at the central processor 1202 or may be integrated as a display panel 1212 in or proximate to the breaker panel 1204 itself, or anywhere else in communication with the nodes. Furthermore, multiple system interfaces may be provided or may interact with the system. For example, in addition to or instead of a display mounted on the power distribution center or central computer as illustrated in FIG. 12, information may be sent to the internet, over the powerline, or wirelessly over a router to a remote device, or may be sent over a network to a phone, etc.

Figure 22A:
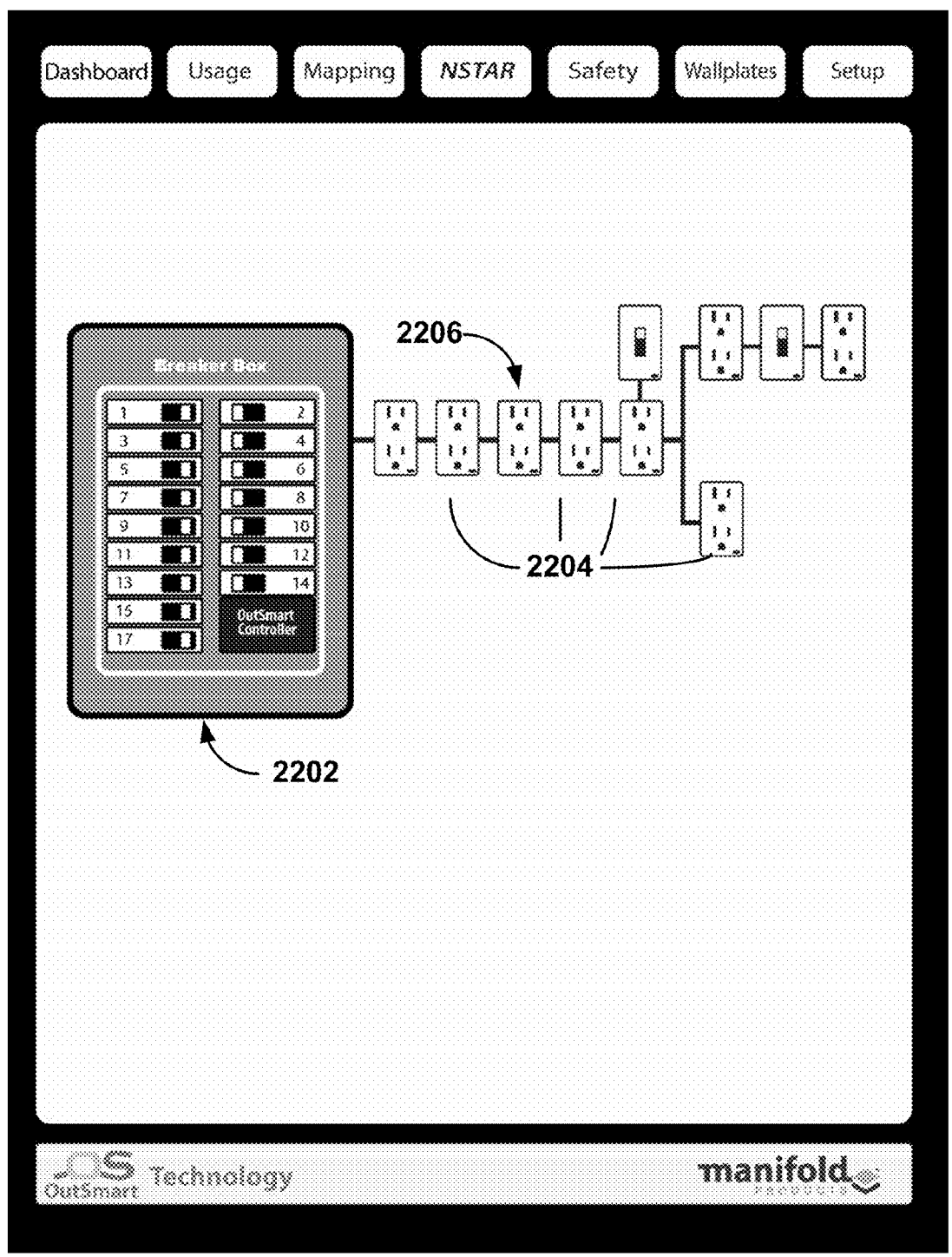
FIG. 22a illustrates an example of a display interface for interacting with the system including a map of nodes in a circuit.
Figure 22B:
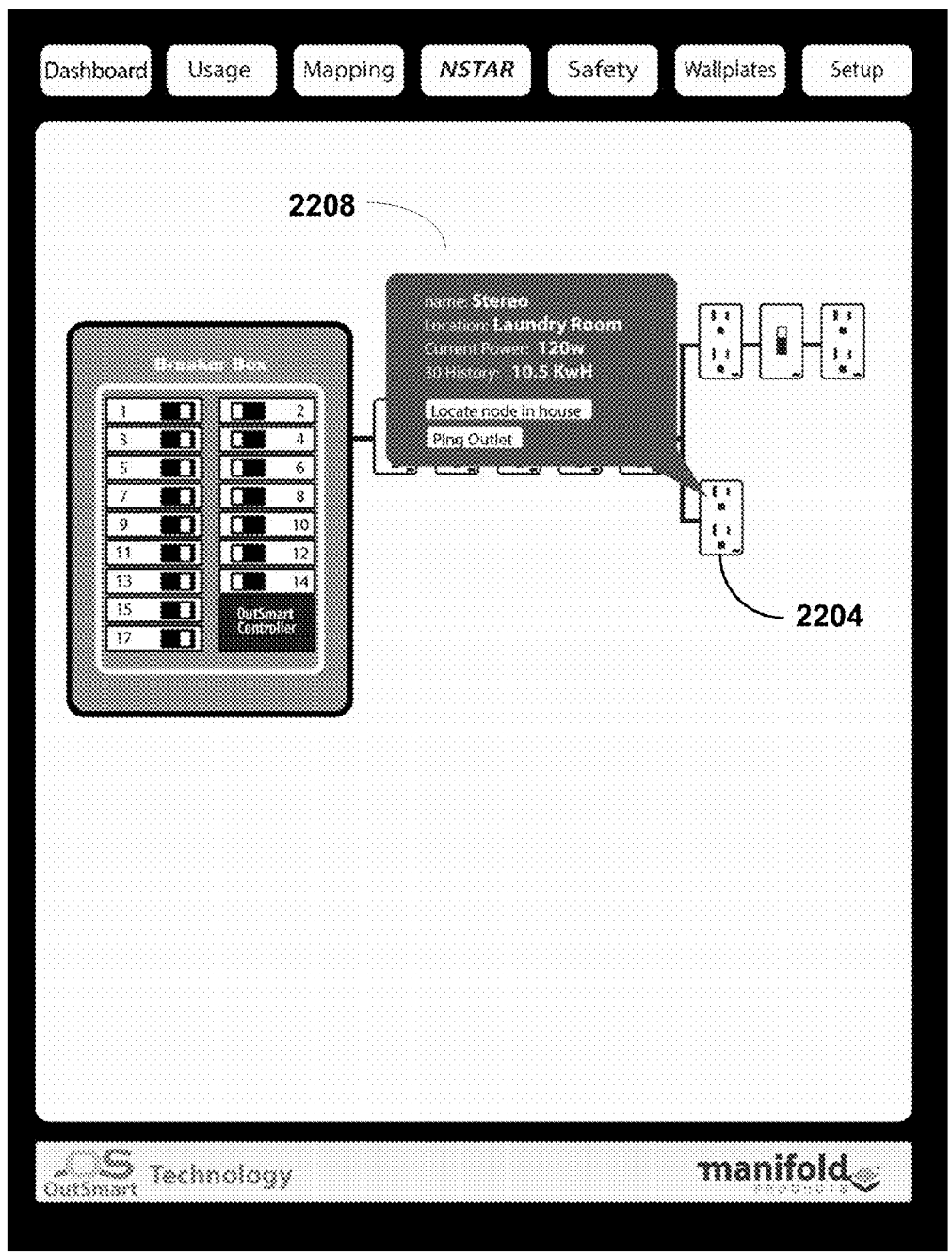
FIG. 22b illustrates an example of a display interface for interacting with the system displaying information regarding a particular node in a circuit.

The interface may generally include a display and a mechanism for interacting with the system, such as a touch screen display, a mouse, keyboard, etc. As illustrated in FIG. 22a, the display may include a representation of the breaker box 2202 and the nodes 2204 mapped to a selected circuit 2206. By selecting a given node 2204 in the circuit 2206, as illustrated in FIG. 22b information 2208 may be displayed as to what may be plugged into the node, the current power usage of the node and the power used by the node over a given time period. It should be appreciated that other or additional information may be displayed as well.

The system may also allow for monitoring the power used at each node and, in fact, the power used at each outlet receptacle (top and bottom), as well as many other items (for instance, temperature, other environmental conditions, exact current draw profile . . . etc). In one example, data may be received by a processor that is indicative of power consumed or a load over a given period of time attached to one or more of the nodes. From this data a power consumption profiles for each node, as well as collective nodes (e.g., nodes of a given room or nodes of a given circuit) may be generated. While such a profile may consider power consumed over a period of time, including seconds, minutes, hours, days, weeks, months or years, the profile may also consider other variables, such as power usage, current draw, power factor, duty cycle, start up current, shut down current, standby power, line voltage, current wave form, time of day, date, location and/or environmental conditions or cross-correlations thereof. Furthermore, data regarding power cost may be utilized to develop cost profiles. A cross-correlation may be understood as the measurement of a similarity across two or more datasets. For example, power consumption and ambient temperature, lighting loads and time of day, start-up current and temperature, etc.

Where deviations of a predetermined amount from the profile are detected, an alert may be provided, power to the node may be cut, or an associated breaker may be tripped. The predetermined amount may be based on the overall profile or given segments of a profile related to time of day, or may be device specific. In addition, the predetermined amount may be based on cost, where energy pricing may be higher during a given time of the day.

Figure 23A:
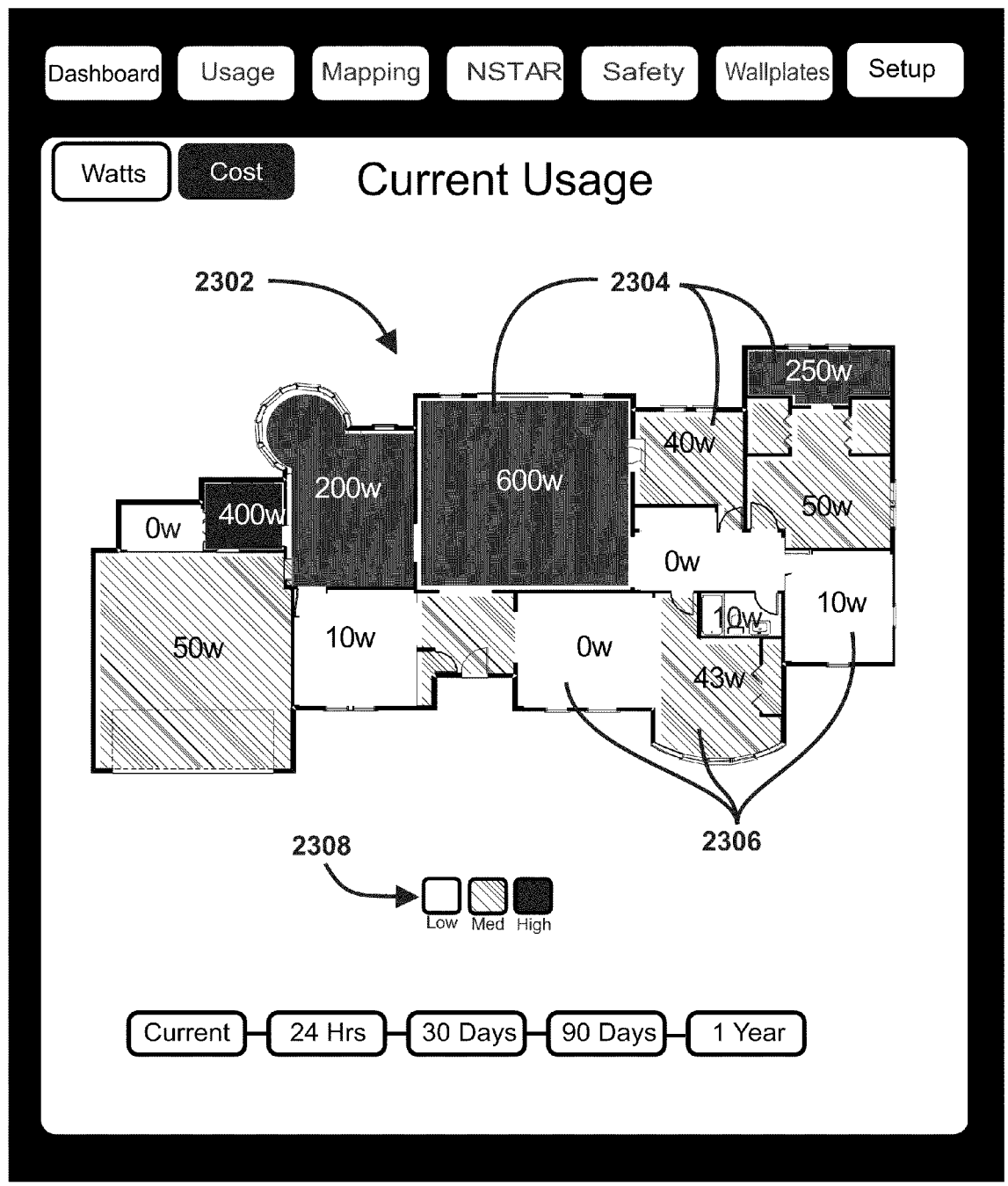
FIG. 23a illustrates an example of a display interface providing information regarding power usage throughout a building.
Figure 23B:
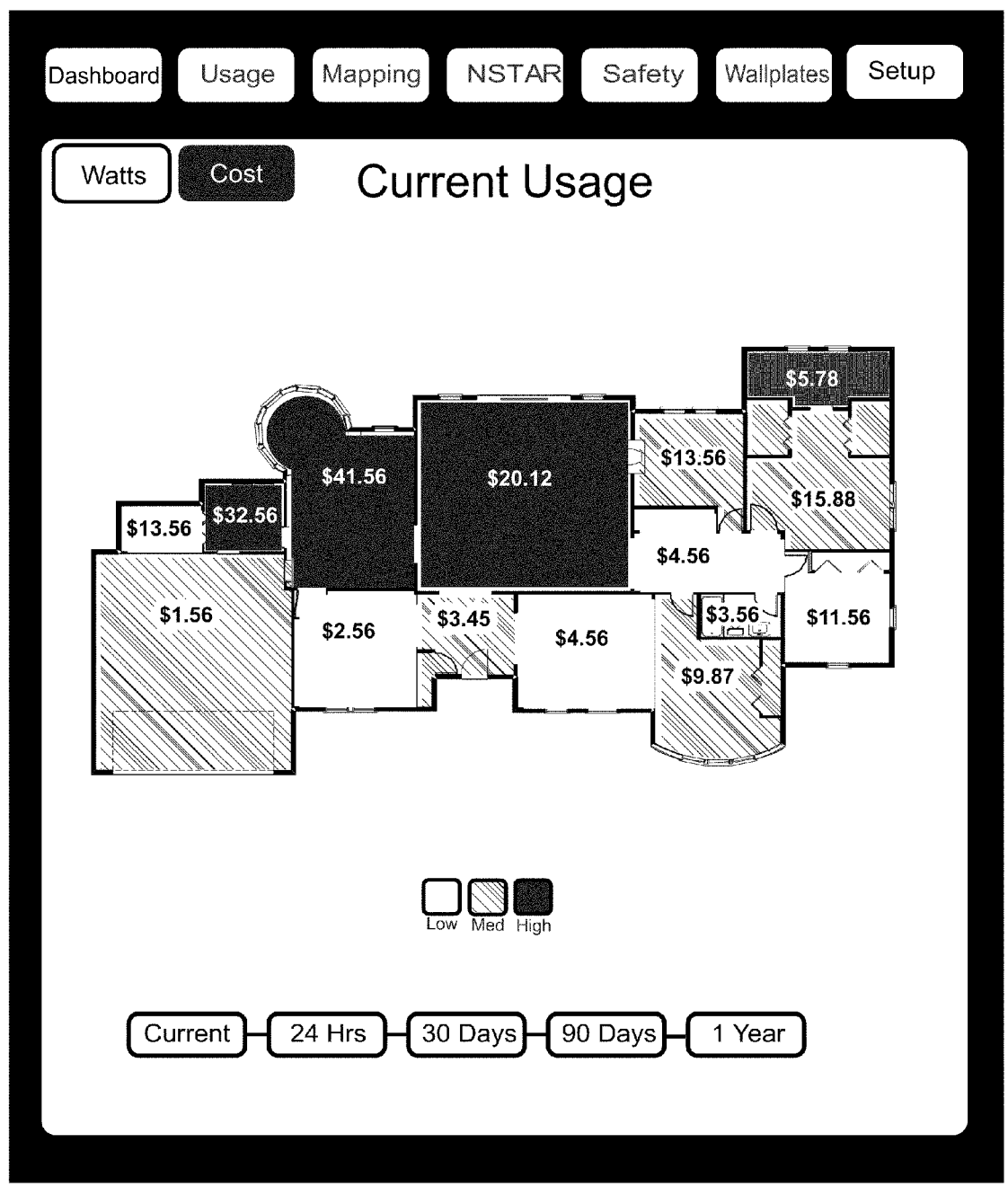
FIG. 23b illustrates an example of a display interface providing information regarding the cost of power usage throughout a building.
Figure 24A:
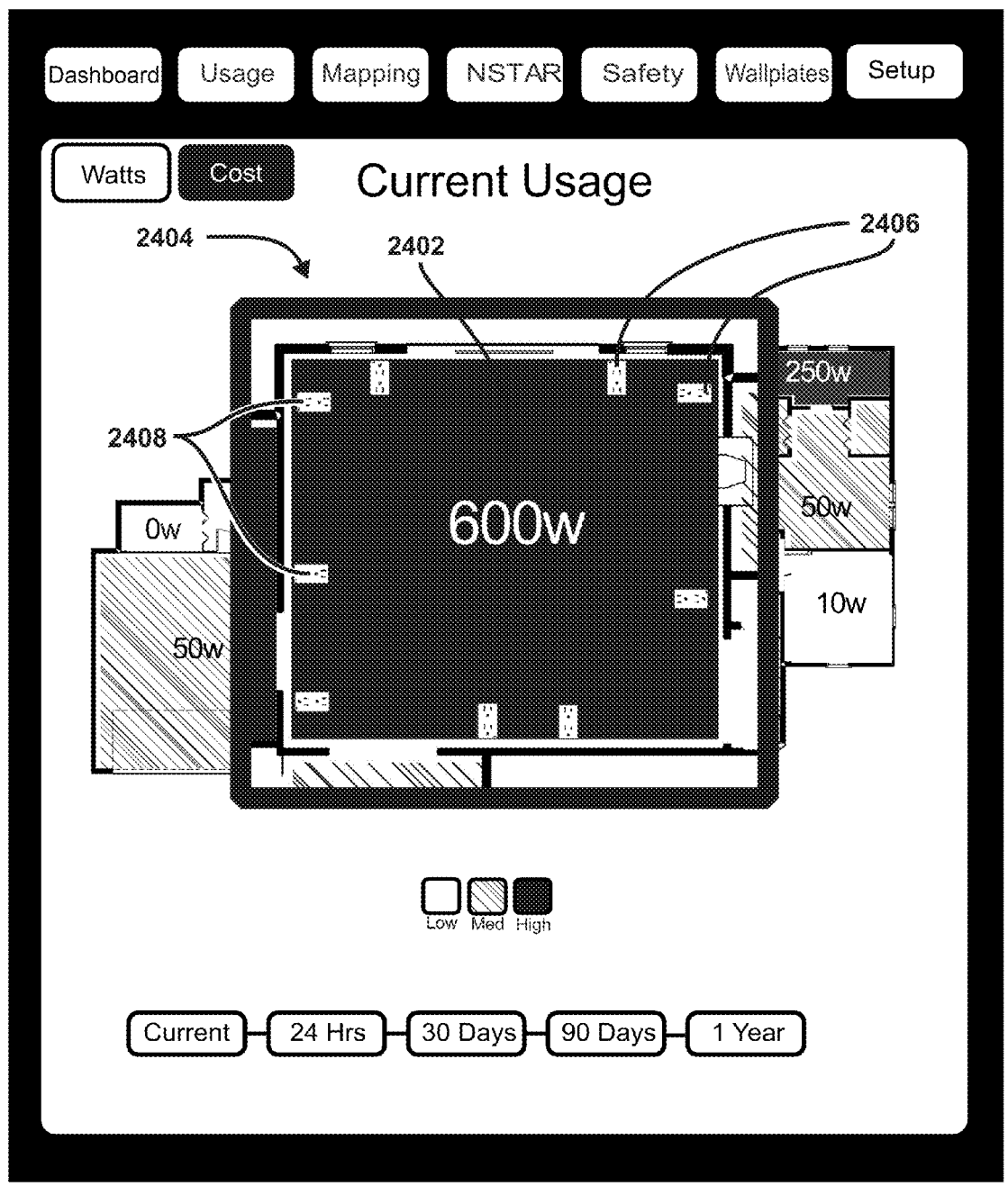
FIG. 24a illustrates an example of a display interface providing information regarding the usage of power in a single room and the relative location of nodes throughout the room.
Figure 24B:
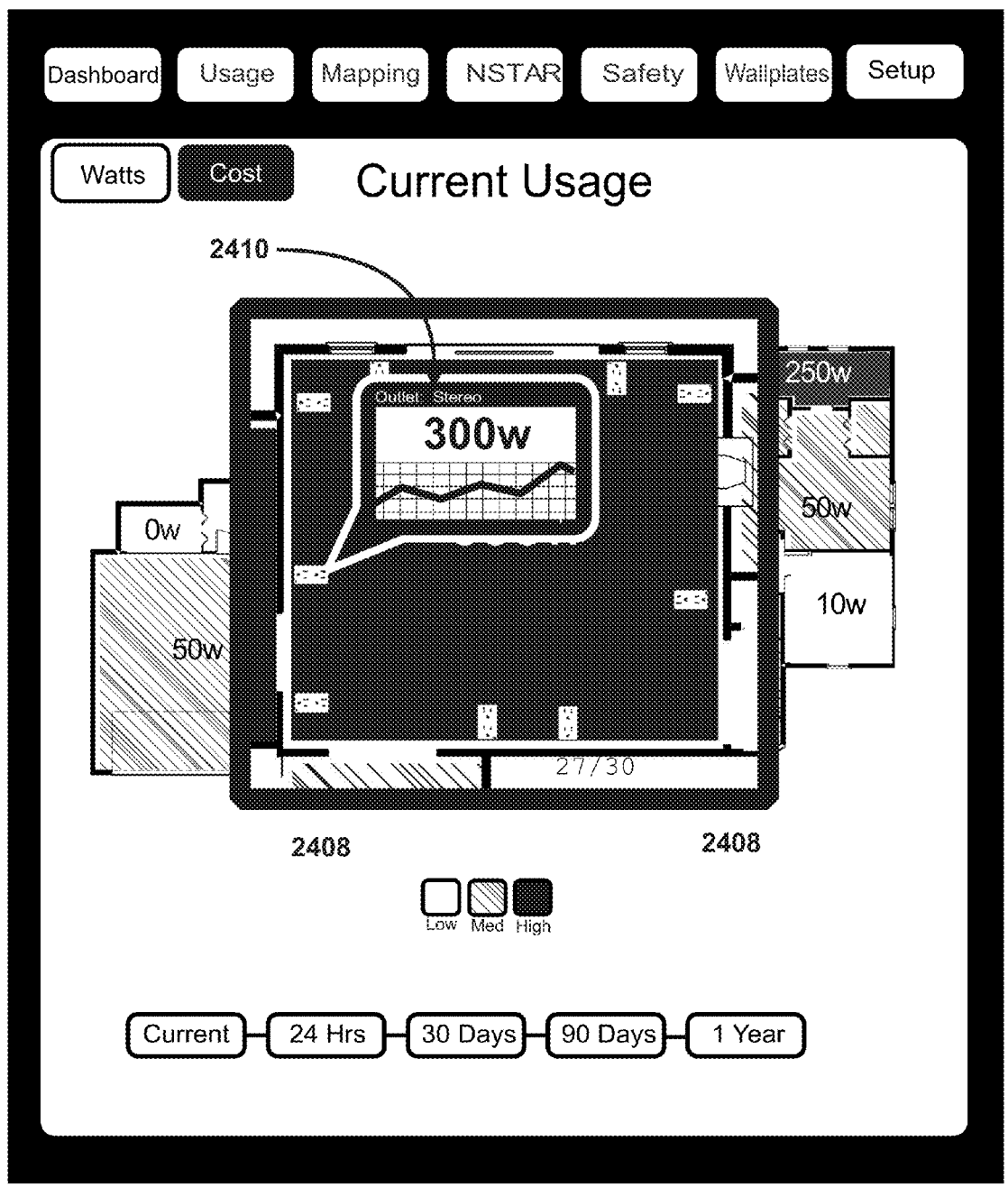
FIG. 24b illustrates an example of a display interface providing information regarding the usage of power for a single node.

FIG. 23a is an illustration of how such data may be displayed to a user. For example the nodes may be associated with given rooms in a building, and determinations may be made as to the power usage of the various rooms, which may be broken down in a variety of units, such as Watts as illustrated in FIG. 23a, Watt-hours or monetary units as illustrated in FIG. 23b. The building 2302, rooms 2304 and power usage in each room 2306 may be displayed to a user. For reference purposes the usage may be quantified in terms of a color scale 2308. In addition, a representation of a specific room may be created, as illustrated in FIG. 24a, wherein information such as the power usage 2402 for the room 2404, node location 2406 or active nodes 2408 may be provided. Analysis of specific nodes may also be made, as illustrated in FIG. 24b, wherein usage at a given node may be determined, profiled 2410 or otherwise analyzed.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A system, comprising:
   a faceplate including a panel having a first surface, a second surface, an opening defined in said faceplate providing communication between said first and second surfaces, an interrupter extending from a first surface of said panel having at least two interrupter contacts thereon and a first electrical circuit operatively coupled to said interrupter contacts;
   a switching device in electrical communication with said first electrical circuit; and
   an electrical receptacle or switch including a housing and a second electrical circuit, wherein said second electrical circuit is in communication with said first electrical circuit when said faceplate is mounted on said electrical receptacle or switch and said interrupter is configured to interrupt said second electrical circuit.

2. The system of claim 1, wherein said second circuit includes at least one hot contact.

3. The system of claim 2, wherein said second electrical circuit further comprises a hot spade contact in separable electrical communication with said hot contact; wherein said faceplate is mounted on said electrical switch and said interrupter extends between said hot contact and said hot spade contact.

4. The system of claim 2, wherein said second electrical circuit comprises a first set of electrically separable hot contacts and a second set of electrically separable hot contacts, wherein when said faceplate is mounted on said switch, said interrupter extends between said second set of hot contacts.

5. The system of claim 1, wherein said faceplate further comprises a tab extending from said first surface of said panel and a first auxiliary contacts mounted on said tab, and said electrical receptacle or switch includes a second auxiliary contacts mounted on said housing in electrical communication with said first auxiliary contacts and said second electrical circuit, when said faceplate is mounted on said electrical receptacle or switch.

6. The system of claim 5, wherein said first auxiliary contacts are in electrical communication with said first electrical circuit.

7. The system of claim 1, wherein said first electrical circuit is in series with said second electrical circuit.

8. The system of claim 1, wherein said switching device is in communication with an electromagnetic communication device.

9. The system of claim 8, wherein said electromagnetic communication device is selected from the group consisting of an optical receiver, an optical transceiver, a radio frequency receiver, a radio frequency transceiver or a wireline transceiver.

10. The system of claim 1, further comprising node electronics.

11. The system of claim 10, wherein said electronics include a microcontroller, a communications function, a switchable micro-load and a coupler.

12. The system of claim 10, further comprising a switching device in electrical communication with said node electronics.

13. A faceplate, comprising:
   a panel having a first surface, a second surface and an opening;
   an interrupter extending from a first surface of said panel having at least two interrupter contacts thereon;
   an electrical circuit mounted on said face plate, wherein said circuit is coupled to said interrupter contacts; and
   a switching device in electrical communication with said electrical circuit.

14. The faceplate of claim 13, wherein said switching device is in electrical communication with an electromagnetic communication device.

15. The faceplate of claim 14, wherein said electromagnetic communication device is selected from the group consisting of an optical receiver, an optical transceiver, a radio frequency receiver, a radio frequency transceiver or a wireline transceiver.

16. The faceplate of claim 13, further comprising a tab extending from said first surface of said panel and at least one or more auxiliary contacts mounted on said tab.

17. The faceplate of claim 16, further comprising a switching device in electrical communication with said at least one or more auxiliary contacts.

18. The system of claim 1, wherein said interrupter is formed of an insulating material.

19. The faceplate of claim 13, wherein said interrupter is formed of an insulating material.

* * * * *